(12) United States Patent
Funk et al.

(10) Patent No.: US 11,556,097 B2
(45) Date of Patent: Jan. 17, 2023

(54) NEURAL NETWORK CIRCUITRY FOR MOTORS WITH FIRST PLURALITY OF NEURONS AND SECOND PLURALITY OF NEURONS

(71) Applicant: Infineon Technologies AG, Neubiberg (DE)

(72) Inventors: Frederik Funk, Munich (DE); Thorsten Bucksch, Munich (DE); Syed Naveed Abbas Rizvi, Munich (DE); Rainer Menes, Munich (DE)

(73) Assignee: Infineon Technologies AG, Neubiberg (DE)

( * ) Notice: Subject to any disclaimer, the term of this patent is extended or adjusted under 35 U.S.C. 154(b) by 435 days.

(21) Appl. No.: 15/931,372

(22) Filed: May 13, 2020

(65) Prior Publication Data
US 2021/0356917 A1 Nov. 18, 2021

(51) Int. Cl.
*G06N 3/02* (2006.01)
*G05B 13/02* (2006.01)
*H02K 11/33* (2016.01)
*G06N 3/063* (2006.01)

(52) U.S. Cl.
CPC ........... *G05B 13/027* (2013.01); *G06N 3/063* (2013.01); *H02K 11/33* (2016.01)

(58) Field of Classification Search
CPC ........ G05B 13/027; G06N 3/063; G06N 3/08; H02K 11/33; H02P 23/0018; H02P 21/0014; H02P 21/18; H02P 21/22
USPC ......................................................... 706/15
See application file for complete search history.

(56) References Cited

U.S. PATENT DOCUMENTS

| 2015/0039545 | A1* | 2/2015 | Li | G06N 3/08 |
| | | | | 706/23 |
| 2018/0367073 | A1 | 12/2018 | Haas | |
| 2020/0109507 | A1* | 4/2020 | Im | D06F 33/32 |

OTHER PUBLICATIONS

Office Action from U.S. Appl. No. 15/931,325, dated Feb. 24, 2022, 14 pp.
Hafner et al., "Neural Reinforcement Learning Controllers for a Real Robot Application," Proceedings 2007 IEEE International Conference on Robotics and Automation, Apr. 10-14, 2007, 6 pp.
Weerasooriya et al., "Identification and Control of a DC Motor Using Back-Propagation Neural Networks," IEEE Transactions on Energy Conversion, vol. 6, No. 4, Dec. 1991, 7 pp.
Riedmiller et al., "Reinforcement learning for robot soccer," Auton Robot, accepted May 4, 2009, 19 pp.
(Continued)

*Primary Examiner* — Charlotte M Baker
(74) *Attorney, Agent, or Firm* — Shumaker & Sieffert, P.A.

(57) ABSTRACT

An apparatus for driving a motor comprising a first plurality of neurons of neural network circuitry, motor circuitry, and a second plurality of neurons of the neural network circuitry. The first plurality of neurons is configured to generate a first cycle value based on a target speed. The motor circuitry is configured to control, based on the first cycle value, a set of switching elements to drive the motor. The second plurality of neurons is configured to train the second plurality of neurons to generate, based on a resulting speed value for the motor that occurs when the motor circuitry has controlled the set of switching elements to drive the motor based on the first cycle value, a second cycle value to minimize a difference between the second cycle value and the first cycle value.

20 Claims, 14 Drawing Sheets

(56) References Cited

OTHER PUBLICATIONS

Hafner, "Dateneffiziente selbstlemende neuronale Regler," in the German language, 2009 (Applicant points out, in accordance with MPEP 609.04(a), that the year of publication, 2009, is sufficiently earlier than the effective U.S. filing date, so that the particular month of publication is not in issue ), 186.
Ward-Foxton, "First Ever ML Training chieved on Microcontroller," EE Times, retrieved from https://www.eetimes.com/first-ever-ml-training-achieved-on-microcontroller/#, Oct. 15, 2020, 3 pp.
Infineon technologies, "TLE9855QX," Rev 1.0, Jul. 26, 2019, 151 pp.
Translation of, "Dateneffiziente selbstlemende neuronale Regler," retrieved from www.DeepL.com/Translator on Dec. 2, 2020, 1 pp.
Notice of Allowance from U.S. Appl. No. 15/931,325, dated May 26, 2022, 11 pp.
Response to Office Action dated Feb. 24, 2022, from U.S. Appl. No. 15/931,325, filed May 19, 2022, 12 pp.

* cited by examiner

NEURAL NETWORK CIRCUITRY FOR MOTORS WITH FIRST PLURALITY OF NEURONS AND SECOND PLURALITY OF NEURONS

TECHNICAL FIELD

This disclosure relates to electric motors, and more particularly, to techniques and circuits associated with electric motors.

BACKGROUND

Operation of electric motors may be performed by a motor circuitry. The motor circuitry may control a rotor rotation of the motor. For example, the motor circuitry may drive current at the motor in order to control the motor and regulate a speed of the motor.

SUMMARY

The disclosure describes techniques, devices, and systems for improving operation of motor circuitry for driving a motor. Rather than relying on complex computing devices and human input to generate training vectors to train neurons, the system may be configured to generate training vectors in real-time. In this way, a neural network controlling the motor circuitry may be trained using training vectors generated by the system itself, which may reduce the complexity of the procedure to generate training sets for the neural network circuitry compared to systems relying on human input and/or complex computing devices to generate training vectors.

In some examples, rather than relying on a static training of neurons, neural network circuitry may be configured to adapt based on error (e.g., a difference) between an actual setup and an ideal setup, which may improve an accuracy of neural network compared to motor controllers using programmed motor controllers and/or statically implemented neural networks.

In one example, the disclosure is directed to an apparatus for driving a motor, the apparatus including a plurality of neurons of neural network circuitry and motor circuitry. The plurality of neurons of neural network circuitry is configured to generate a cycle value based on a target speed, based on a speed value associated with the motor at a particular time, and based on a current value associated with the motor at the particular time. The plurality of neurons is configured to be trained to generate the cycle value to minimize an error between the cycle value and a training cycle value for each training vector of a plurality of training vectors. The apparatus is configured to have generated the plurality of training vectors. The motor circuitry is configured to control, based on the cycle value, a set of switching elements to drive the motor.

In another example, the disclosure is directed to a method for driving a motor, the method including generating, by a plurality of neurons of neural network circuitry of an apparatus for driving the motor, a cycle value based on a target speed, based on a speed value associated with the motor at a particular time, and based on a current value associated with the motor at the particular time. The plurality of neurons is configured to be trained to generate the cycle value to minimize an error between the cycle value and a training cycle value for each training vector of a plurality of training vectors. The apparatus is configured to have generated the plurality of training vectors. The method further includes controlling, by motor circuitry and based on the cycle value, a set of switching elements to drive the motor.

In one example, the disclosure is directed to an apparatus for driving a motor, the apparatus including a set of switching elements, a plurality of neurons of neural network circuitry, and motor circuitry. The plurality of neurons of neural network circuitry is configured to generate a cycle value based on a target speed, based on a speed value associated with the motor at a particular time, and based on a current value associated with the motor at the particular time. The plurality of neurons is configured to be trained to generate the cycle value to minimize an error between the cycle value and a training cycle value for each training vector of a plurality of training vectors. The apparatus is configured to have generated the plurality of training vectors. The motor circuitry is configured to control, based on the cycle value, the set of switching elements to drive the motor.

In another example, the disclosure is directed to an apparatus comprising: means for generating, with a plurality of neurons, a cycle value based on a target speed, based on a speed value associated with the motor at a particular time, and based on a current value associated with the motor at the particular time. The plurality of neurons is configured to be trained to generate the cycle value to minimize an error between the cycle value and a training cycle value for each training vector of a plurality of training vectors. The apparatus is configured to have generated the plurality of training vectors. The apparatus further includes means for controlling, based on the cycle value, a set of switching elements to drive the motor.

In one example, the disclosure is directed to an apparatus for driving a motor, the apparatus including a first plurality of neurons of neural network circuitry, motor circuitry, and a second plurality of neurons of the neural network circuitry. The first plurality of neurons of neural network circuitry is configured to generate a first cycle value based on a target speed. The motor circuitry is configured to control, based on the first cycle value, a set of switching elements to drive the motor. The second plurality of neurons of the neural network circuitry is configured to train the second plurality of neurons to generate, based on a resulting speed value for the motor that occurs when the motor circuitry has controlled the set of switching elements to drive the motor based on the first cycle value, a second cycle value to minimize a difference between the second cycle value and the first cycle value.

In another example, the disclosure is directed to a method for driving a motor, the method including generating, by a first plurality of neurons of neural network circuitry, a first cycle value based on a target speed and controlling, by motor circuitry and based on the first cycle value, a set of switching elements to drive the motor. The method further include training, by the neural network circuitry, a second plurality of the neurons of neural network circuitry to generate, based on a resulting speed value for the motor that occurs when the motor circuitry has controlled the set of switching elements to drive the motor based on the first cycle value, a second cycle value to minimize a difference between the second cycle value and the first cycle value.

In one example, the disclosure is directed to an apparatus for driving a motor, the apparatus including motor circuitry, a first plurality of neurons of neural network circuitry, and a second plurality of neurons of neural network circuitry. The motor circuitry is configured to control a set of switching elements to drive the motor based on a first cycle value. The first plurality of neurons of the neural network circuitry is configured to generate a plurality of training vectors, train, when a predetermined variable mechanical load is applied to the motor, the first plurality of neurons to generate the first cycle value to minimize a difference between the first cycle value and the training cycle value for each training vector of the plurality of training vectors, and generate the first cycle value based on a target speed. The second plurality of neurons of the neural network circuitry is configured to train, when the predetermined variable mechanical load is not applied to the motor, the second plurality of neurons to generate, based on a resulting speed value for the motor that occurs when the motor circuitry has controlled the set of switching elements to drive the motor based on the first cycle value, a second cycle value to minimize a difference between the second cycle value and the first cycle value.

In another example, the disclosure is directed to an apparatus comprising: means for generating, with a first plurality of neurons of neural network circuitry, a first cycle value based on a target speed and means for controlling, based on the first cycle value, a set of switching elements to drive the motor. The apparatus further includes means for training a second plurality of the neurons of neural network circuitry to generate, based on a resulting speed value for the motor that occurs when the motor circuitry has controlled the set of switching elements to drive the motor based on the first cycle value, a second cycle value to minimize a difference between the second cycle value and the first cycle value.

The details of one or more examples are set forth in the accompanying drawings and the description below. Other features, objects, and advantages of the disclosure will be apparent from the description and drawings, and from the claims.

Figure 1:
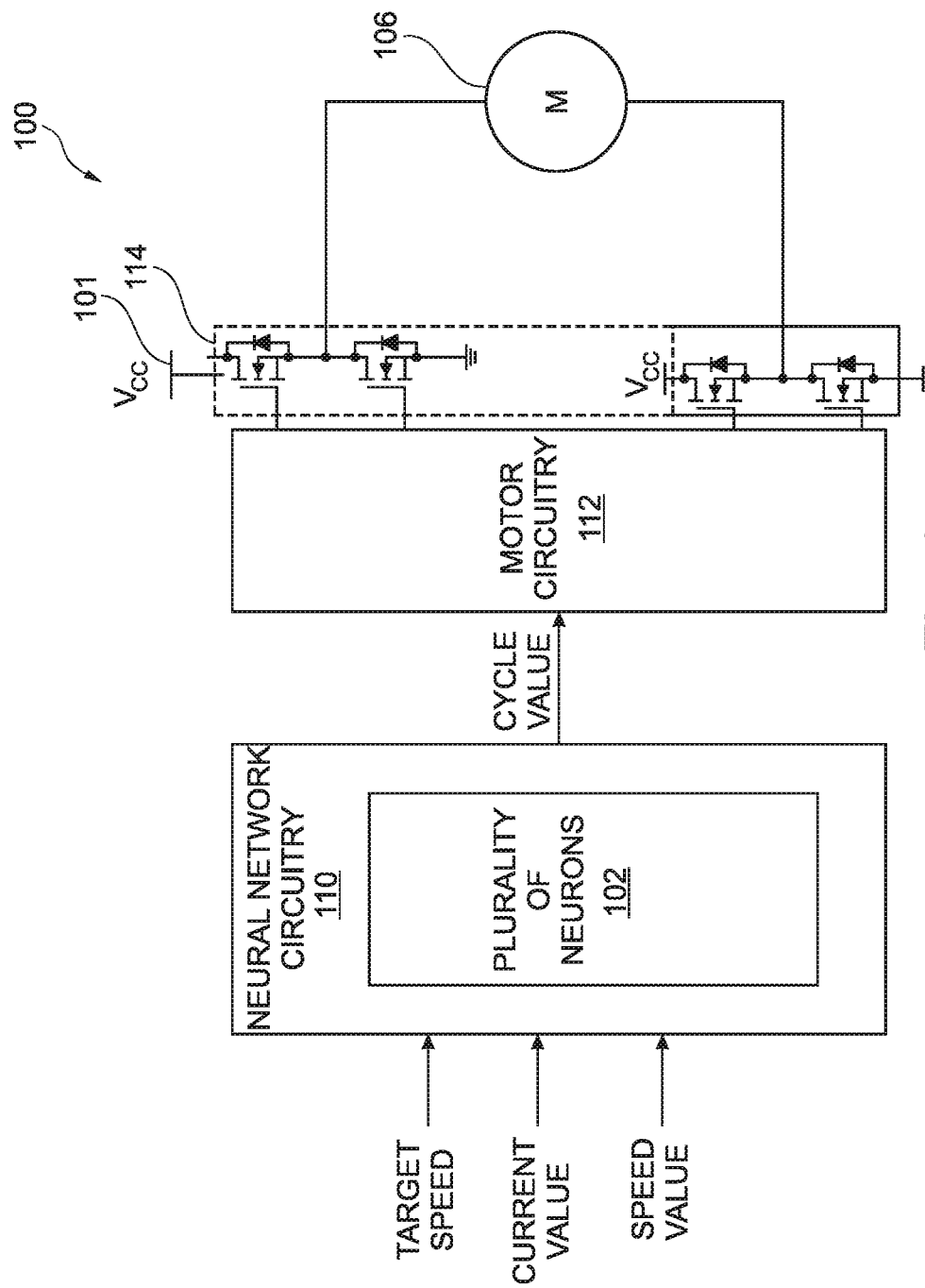
FIG. 1 is a block diagram illustrating an example first system configured for driving a motor using neural network circuitry, in accordance with one or more techniques of this disclosure.

The details of one or more examples are set forth in the accompanying drawings and the description below. Other features, objects, and advantages will be apparent from the description, drawings, and claims.

DETAILED DESCRIPTION

Motor regulation may be performed with a regulator, which may include proportional and an integral (PI) control. The regulator may generate a digital modulation signal (e.g., a pulse-width modulation (PWM) signal, a pulse density modulation (PDM) signal, a pulse-code modulation (PCM) signal, a sigma-delta modulation, or another type of digital modulation signal). The digital modulation signal may switch (e.g., activate or deactivate) switching elements (e.g., transistors of a motor bridge). The motor regulation may use the speed of the motor (e.g., using a back-electromagnetic force (BEMF) voltage) and the mechanical torque in form of the motor current as a feedback. The regulator may use these feedback signals (e.g., the BEMF voltage and/or the motor current) to realize either a constant speed or a constant torque regulation.

While this disclosure refers to systems configured to apply constant speed regulation, techniques described herein may be applied to motor systems configured to apply a constant torque. In the example of constant speed, the regulator may apply constant speed regulation using an algorithm programed by a human user (e.g., in the C programming language) that is compiled and stored in memory (e.g., a flash memory of a microcontroller). In some examples, hardware may interface a motor bridge with the control signals from a system-on-chip, which is controlled by microcontroller software.

Some systems implementing a neural network may perform a process of generating, by a human user, training vectors for a particular application. The training vectors may be output to high-performance hardware (e.g., using a graphics processing unit or GPU) to "train" neurons of neural network circuitry. However, such systems may rely on human interaction as well as high-performance hardware that is discrete from a micro-controller integrated in a system-on-chip of a motor controller. Moreover, the system-on-chip of the motor controller may have limited random access memory, which would not be sufficient to store the various training vectors for training the neurons.

Rather than relying on a human user to generate training vectors and/or relying on high-performance hardware that is discrete from a motor controller to train neurons for driving a motor, techniques described herein may configure the motor controller itself to train neurons for driving a motor. The motor controller may receive the same or different input signals used by an algorithm programed by a human user (e.g., the BEMF voltage and/or the motor current) and may generate as an output a value for the cycle value (e.g., a PWM duty cycle) which may control the motor speed. In other words, the motor controller may not be programmed by a human user and may not be preconfigured to a particular motor application. Instead, the motor controller itself may be configured to learn how to control the motor, which may be a more optimal control than can be achieved by human programming.

The disclosure includes aspects to realize the neural network training and execution using deep learning techniques. Techniques described herein may be adapted and in some examples, may be configured to work in a low-power and/or low-performance environment (e.g., a microcontroller). For example, neural network circuitry may be configured to implement a minimal set of neurons to achieve a sufficient regulation quality. In some examples, neural network circuitry of a motor controller may include a number of neurons (e.g., less than 10 neurons, less than 50 neurons, or another number of neurons) that are adapted for a motor controller, such as, for example, a microcontroller, rather than a predetermined number of neurons (e.g., greater than 100 neurons, greater than 1,000 neurons, or another predetermined number of neurons) adapted for high-performance hardware discrete from the motor controller. In some examples, a motor controller may apply a maximum delta operation (also referred to herein as "MaxDelta operation") to stabilize speed regulation by reducing a maximum allowable signal jump. For instance, the motor controller may be configured to limit a maximum change in speed at a motor such that a control response of the motor controller is dampened, which may help to improve a stability of the motor controller. In some examples, the neural network circuitry may be configured to use a 32-bit float format to represent values (e.g., a speed value, a current value, a cycle value, and/or another value), which may help to reduce or eliminate quantization of the values.

Additionally, or alternatively, in some examples, techniques described herein may include a neural network configured to learn on the fly while a system is in-service and after the neural network circuitry has trained a first plurality of neurons to regulate a motor. For example, in some cases, the neural network circuitry may be configured to adapt a second plurality of neurons based on an observed resulting speed value at the motor while the motor is regulated (e.g., to a speed or torque) by the first plurality of neurons. This adaption may account for various mechanical and/or electrical changes (e.g., aging of the motor and/or other changes), which may improve an accuracy of the system compared to motor controllers using programmed motor controllers and/or statically implemented neural networks.

FIG. 1 is a block diagram illustrating an example first system 100 configured for driving a motor 106 using neural network circuitry 110, in accordance with one or more techniques of this disclosure. System 100 (also referred to herein as a "motor controller" or "an apparatus for driving the motor") may include supply 101, neural network circuitry 110, motor circuitry 112, set of switching elements 114, and motor 106. While FIG. 1 shows system 100 as having separate and distinct components, some components may be combined or further separated. For example, motor circuitry 112 and neural network circuitry 110 may be combined. For instance, motor circuitry 112 and neural network circuitry 110 may be formed into a system on a chip (SOC) and/or an integrated circuit (IC). In some examples, however, motor circuitry 112 may be separate and distinct from neural network circuitry 110.

Supply 101 may be configured to provide electrical power to one or more other components of system 100. For instance, supply 101 may be configured to supply power to motor 106. In some examples, supply 101 may be a battery which may be configured to store electrical energy. Examples of batteries may include, but are not limited to, nickel-cadmium, lead-acid, nickel-metal hydride, nickel-zinc, silver-oxide, lithium-ion, lithium polymer, any other type of rechargeable battery, or any combination of the same. In some examples, supply 101 may be an output of a power converter or power inverter. For instance, supply 101 may be an output of a direct current (DC) to DC power converter, an alternating current (AC) to DC power converter, a DC to AC power inverter, and the like. In some examples, the input power signal provided by supply 101 may be a DC input power signal. For instance, supply 101 may be configured to provide a DC input power signal in the range of ~5 VDC to ~40 VDC.

Motor 106 may comprise a DC brushless motor, also known as a brushless DC motor, or simply "BLDC motor." In some examples, motor 106 may comprise a DC-excited motor. For example, motor 106 may include a shaft, rotor, stator, and permanent magnet. A permanent magnet may be mounted on or in the rotor. In some examples, the permanent magnet may be surface mounted to the rotor, inset in the rotor, or buried within the rotor. In some examples, the permanent magnet may be an interior magnet. The permanent magnet may include rare-earth elements, such as Neodymium-Iron-Boron (NdFeB), Samarium-Cobalt (SmCo), or Ferrite elements (e.g., Barium (Ba) or Strontium (Sr)). In some examples, the permanent magnet may include a protective coating such as a layer of Gold (Au), Nickel (Ni), Zinc (Zn), other elements, and/or other compounds.

Motor circuitry 112 may be configured to control, based on a cycle value output from neural network circuitry 110, set of switching elements 114 to drive motor 106. For example, motor circuitry 112 may include circuitry configured to generate, based on the cycle value (e.g., a duty cycle value), a digital modulated signal. Examples of a digital modulated signal may include, for example, a pulse width modulated (PWM) signal, a pulse density modulation (PDM) signal, a pulse-code modulation (PCM) signal, a sigma-delta modulation, or another digital modulated signal. Examples of a cycle value may include, for example, a PWM cycle value, a PDM cycle value, a PCM cycle value, a sigma-delta modulation cycle value, or another cycle value.

Motor circuitry 112 may be configured to drive, based on the digital modulated signal, set of switching elements 114 to operate in at least a first switching state and a second switching state. During the first switching state, set of switching elements 114 may electrically couple a first terminal of motor 106 and a first supply terminal (e.g., a positive terminal, a negative terminal or a ground terminal) of supply 101 and electrically couple a second terminal of the motor and a second supply terminal (e.g., a negative terminal, a positive terminal or a ground terminal) of supply 101. During the second switching state, set of switching elements 114 may electrically couple the second terminal of the motor and the first supply terminal (e.g., a positive terminal or a negative terminal) of supply 101 and may electrically couple the first terminal of the motor and the second supply terminal (e.g., a negative terminal or a positive terminal) of supply 101.

Motor circuitry 112 may include, for example, a microcontroller on a single integrated circuit containing a processor core, memory, inputs, and outputs. For example, motor circuitry 112 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, motor circuitry 112 may be a combination of one or more analog components and one or more digital components.

As shown in FIG. 1, set of switching elements 114 may include four switching elements. In other examples, set of switching elements 114 may include fewer (e.g., one switching element, two switching elements, or three switching elements) or additional switching elements (e.g., more than four switching elements) than shown in the example of FIG. 1. Examples of switching elements may include, but are not limited to, a silicon-controlled rectifier (SCR), a Field Effect Transistor (FET), and a bipolar junction transistor (BJT). Examples of FETs may include, but are not limited to, a junction field-effect transistor (JFET), a metal-oxide-semiconductor FET (MOSFET), a dual-gate MOSFET, an insulated-gate bipolar transistor (IGBT), any other type of FET, or any combination of the same. Examples of MOSFETS may include, but are not limited to, a depletion mode p-channel MOSFET (PMOS), an enhancement mode PMOS, depletion mode n-channel MOSFET (NMOS), an enhancement mode NMOS, a double-diffused MOSFET (DMOS), any other type of MOSFET, or any combination of the same. Examples of BJTs may include, but are not limited to, PNP, NPN, heterojunction, or any other type of BJT, or any combination of the same. It should be understood that switching elements may be high-side or low-side switching elements. Additionally, switching elements may be voltage-controlled and/or current-controlled. Examples of current-controlled switching elements may include, but arm not limited to, gallium nitride (GaN) MOSFETs, BJTs, or other current-controlled elements.

Neural network circuitry 110 may include a plurality of neurons 102 configured to generate a cycle value (e.g, a duty cycle value) based on a target speed, based on a speed value associated with motor 106 at a particular time, and based on a current value associated with motor 106 at the particular time. As shown, neural network circuitry 110 may receive the target speed, the speed value, and the current value. For instance, neural network circuitry 110 may be configured to, with the speed circuitry, generate the speed value based on a measurement of a BEMF voltage at motor 106 and/or using an external sensor, for example, a Hall sensor, or another sensor configured to deliver a voltage and/or a digital value (e.g., not a current) indicating a speed at motor 106. Neural network circuitry 110 may include, for example, a microcontroller on a single integrated circuit containing a processor core, memory, inputs, and outputs. For example, neural network circuitry 110 may include one or more processors, including one or more microprocessors, DSPs, ASICs, FPGAs, or any other equivalent integrated or discrete logic circuitry, as well as any combinations of such components. In some examples, neural network circuitry 110 may be a combination of one or more analog components and one or more digital components.

A plurality of neurons 102 may be configured to be trained to generate the cycle value to minimize an error between the cycle value and a training cycle value for each training vector of a plurality of training vectors. For example, plurality of neurons 102 may be pre-configured to have been trained to generate a cycle value using techniques described herein. In some example, plurality of neurons 102 may not have been trained and may be configured to perform training to generate a cycle value using techniques described herein. For instance, plurality of neurons 102 may be untrained and may be configured to perform training to generate the cycle value to minimize an error between the cycle value and a training cycle value for each training vector of a plurality of training vectors.

In some systems, high-performance hardware (e.g., using a graphics processing unit discrete from system 100) may train plurality of neurons 102 of neural network circuitry 110. In such systems, a human user may generate a set of training vectors. For example, the human user may determine, for each training vector of a set of training vectors, a training cycle value for a target speed, a current value, and a speed value. In some cases, the human user may run motor 106 at a desired load. In such cases, the human user may determine an operating rotor speed value at motor 106 and an operating current value at motor 106. The human user may then drive motor circuitry 112 to output a training cycle value. In this example, the human user may determine (e.g., measure) a resulting rotor speed at motor 106. The human user may generate a single training vector as including the training cycle value, the operating rotor speed value as a speed value, the operating current value as a current value, and the resulting speed value as a target speed. In this example, the human user may select different starting motor speeds, different loads at motor 106, different cycle values, and/or other parameters to generate the entire set of training vectors. With a database of data representing the set of training vectors, the human user may batch train plurality of neurons 102 using all of the training vectors. In this way, the high-performance hardware may train plurality of neurons 102 using the human generated training vectors. However, such systems may rely on human interaction and/or high-performance hardware, which may increase a cost to implement the motor controller.

In accordance with the techniques of the disclosure, system 100 may be configured to have generated a plurality of training vectors. For example, system 100 may, without human interaction, have selected different starting motor speeds, different loads at motor 106, different cycle values, and/or other parameters to have generated training vectors of the set of training vectors. In some examples, system 100 may, without human interaction, be configured to select different starting motor speeds, different loads at motor 106, different cycle values, and/or other parameters to generate training vectors of the set of training vectors.

Rather than generating a large database of data including all of the information to train plurality of neurons 102, neural network circuitry 110 may have trained or may be configured to train plurality of neurons 102 in real-time. For example, neural network circuitry 110 may drive motor 106 to a training cycle value and generate a training vector using a resulting rotor speed as a target speed. In this example, neural network circuitry 110 may train plurality of neurons 102 using the training vector in-real time. That is, neural network circuitry 110 may train plurality of neurons 102 without waiting for additional training vectors to be generated.

System 100 may reuse data (e.g., speed values, current values, cycle values, or other values) to generate additional training vectors. That is, system 100 may generate a new training vector using information (e.g., a speed value, a current value, a cycle value, or other values) of a previous training vector and/or reuse memory allocated to store a previous training vector for storing a first training vector. In this way, system 100 may operate with less memory storage consumption compared to systems that batch train neurons using multiple training vectors.

Figure 2:
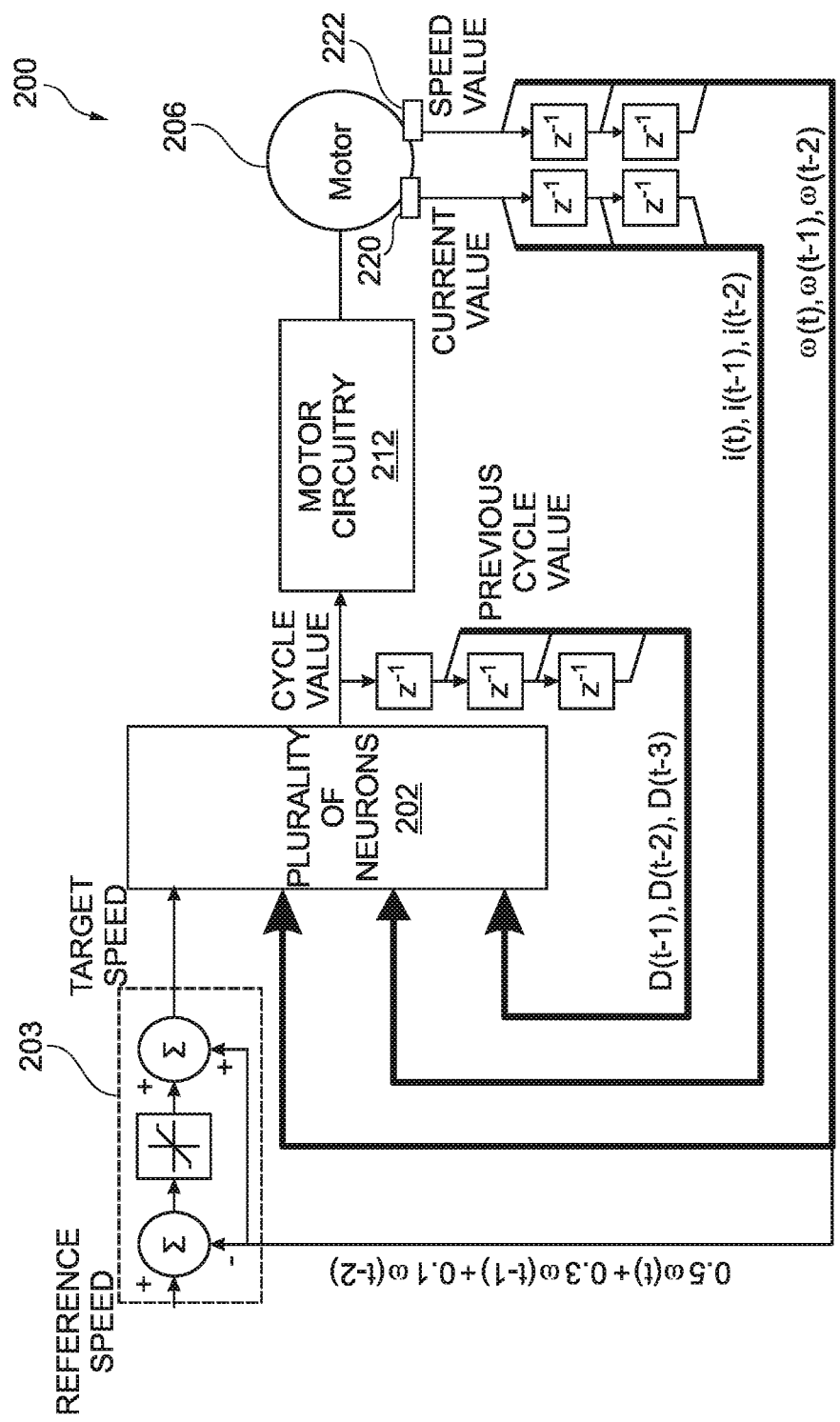
FIG. 2 is a block diagram illustrating an example second system configured for driving a motor, in accordance with one or more techniques of this disclosure.

FIG. 2 is a block diagram illustrating an example second system 200 configured for driving a motor 206 using neural network circuitry, in accordance with one or more techniques of this disclosure. Plurality of neurons 202, motor circuitry 212, and motor 206 may comprise examples of plurality of neurons 102, motor circuitry 112, and motor 106 of FIG. 1. As shown, the example of FIG. 2 further includes maximum speed delta circuitry 203, current circuitry 220, and speed circuitry 222.

Maximum speed delta circuitry 203 may be configured to receive a reference speed and determine a target speed based on the reference speed, a speed value associated with motor 206 at the particular time, and one or more previous speed values associated with motor 206 at one or more previous times that occur before the particular time. For example, maximum speed delta circuitry 203 may generate the target speed as $W1*\omega(t)+W2*\omega(t-1)+W3*\omega(t-2)$, where W1 is a first weight value, W2 is a second weight value. W3 is a third weight value, $\omega(t)$ is a speed value at the particular time (t), $\omega(t-1)$ is a speed value at a first previous time, and $\omega(t-2)$ is a speed value at a second previous time. For instance, maximum speed delta circuitry 203 may generate the target speed as $0.5*\omega(t)+0.3*\omega(t-1)+0.1*\omega(t-2)$.

Current circuitry 220 may be configured to determine a current value at a particular time (i(t)), a first previous time (i(t−1)), and a second previous time (i(t−2)). Current circuitry 220 may include, for example, a Hall effect sensor configured to generate a voltage which is proportional to a magnetic flux density at a rotor or stator of motor 206. The current values (e.g., i(t), i(t−1), i(t−2), or other current values) may be proportional to a torque generated by motor 206. For example, current circuitry 220 (or other circuitry of system 200) may be configured multiply the measured current at motor 206 and a predetermined factor (e.g., a torque constant) to determine a torque generated by motor 206. While the example of FIG. 2 stores three current values, other examples may store fewer current values (e.g., one current value or two current values) or store more current values (e.g., more than three current values).

Speed circuitry 222 may be configured to determine a speed value at a particular time ($\omega(t)$), a first previous time ($\omega(t-1)$), and a second previous time ($\omega(t-2)$). Speed circuitry 222 may measure a back-electromagnetic force (BEMF) voltage at motor 206 and at the particular time. In this example, speed circuitry 222 may be configured to determine the speed value associated with the motor at the particular time based on the back-electromagnetic force voltage. For example, speed circuitry 222 (or other circuitry of system 200) may be configured multiply the measured BEMF voltage at motor 206 and a predetermined factor (e.g., a back EMF constant) to generate a speed value. While the example of FIG. 2 stores three speed values, other examples may store fewer speed values (e.g., one speed value or two speed values) or store more speed values (e.g., more than three speed values).

In accordance with the techniques of the disclosure, plurality of neurons 202 may generate the cycle value based on a target speed output by maximum speed delta circuitry 203, one or more current values (e.g., i(t), i(t−1), i(t−2), and/or other current values), one or more speed values (e.g., $\omega(t)$, $\omega(t-1)$, $\omega(t-2)$, and/or other speed values), and one or more previous cycle values (e.g., D(t), D(t−1), D(t−2), and/or other cycle values). For example, plurality of neurons 202 may generate the cycle value based on a speed value (e.g., $\omega(t)$) associated with motor 206 at a particular time (e.g., t), and based on a current value (e.g., i(t)) associated with motor 206 at the particular time (e.g., t).

In some examples, plurality of neurons 202 may generate the cycle value based on a previous speed value (e.g., $\omega(t-1)$) associated with motor 206 at a previous time (e.g., t−1) that occurred before the particular time (e.g., t) and/or a previous current value (e.g., i(t−1) associated with motor 206 at the previous time (e.g., t−1). In some examples, plurality of neurons 202 may generate the cycle value based on a second previous speed value (e.g., $\omega(t-2)$) associated with motor 206 at a previous time (e.g., t−2) that occurred before the particular time (e.g., t) and before the previous time (e.g., t−1) and/or a second previous current value (e.g., i(t−2) associated with motor 206 at the second previous time (e.g., t−2)).

In some examples, plurality of neurons 202 may generate the cycle value based on one or more of a first previous cycle value (e.g., D(t−1)) associated with motor 206 at a previous time (e.g., t−1) that occurred before the particular time (e.g., t), a second previous cycle value (e.g., D(t−2)) associated with motor 206 at a second previous time (e.g., t−2) that occurred before the particular time (e.g., t) and before the previous time (e.g., t−1) and/or a third previous cycle value (e.g., D(t−3)) associated with motor 206 at a third previous time (e.g., t−3) that occurred before the particular time (e.g., t), before the second previous time (e.g., t−1), and before the third previous time (e.g., t−2).

Figure 3:
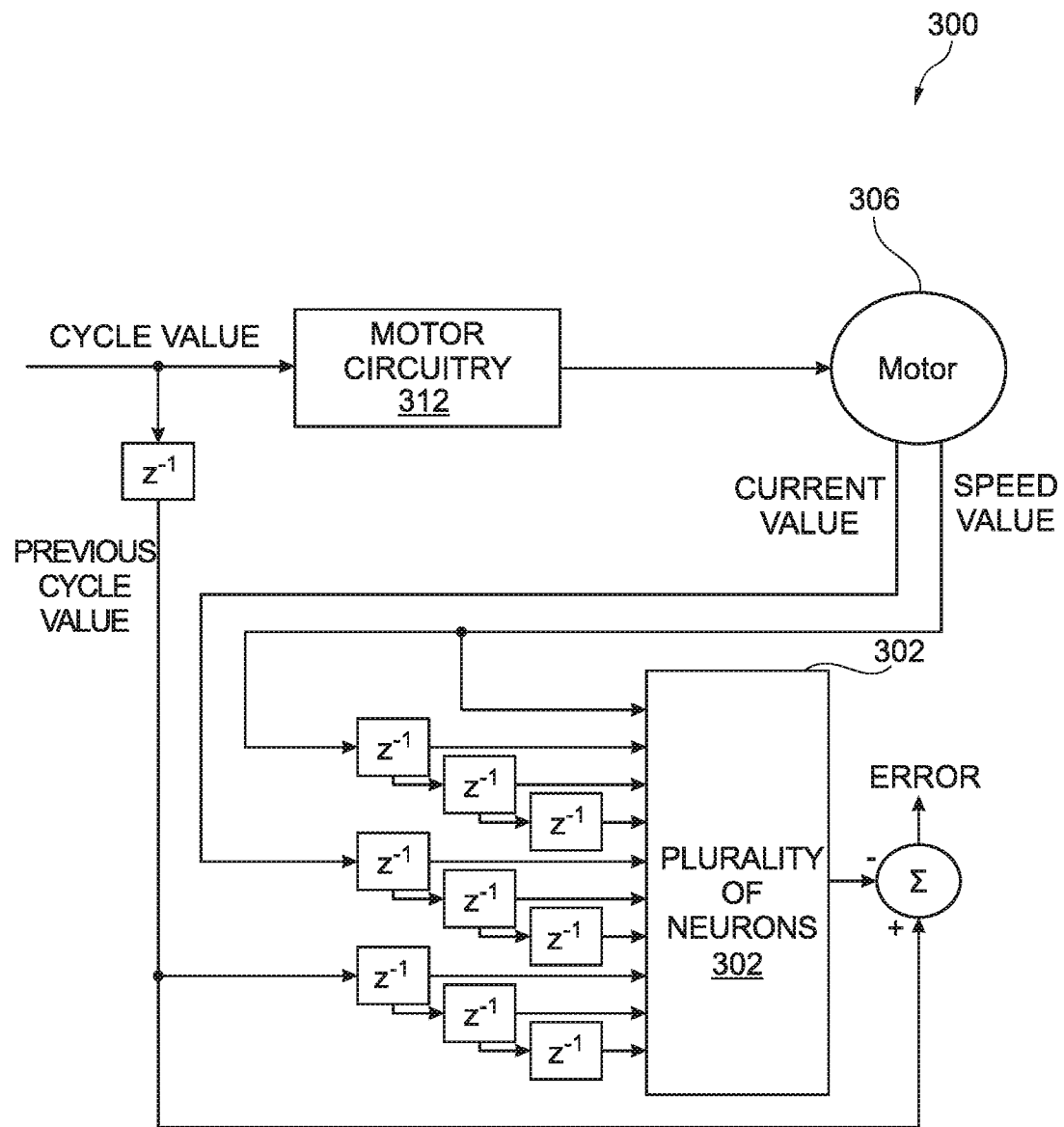
FIG. 3 is a block diagram illustrating an example system configured for training a plurality of neurons, in accordance with one or more techniques of this disclosure.

FIG. 3 is a block diagram illustrating an example system 300 configured for training a plurality of neurons 302, in accordance with one or more techniques of this disclosure. Plurality of neurons 302, motor circuitry 312, and motor 306 may be examples of plurality of neurons 102, motor circuitry 112, and motor 106 of FIG. 1.

In accordance with the techniques of the disclosure, neural network circuitry may be configured to have, for each training vector of the plurality of training vectors, output the training cycle value to motor circuitry 312 and to have determined a resulting speed value associated with motor 306 that occurs when the training cycle value has been output to motor circuitry 312. For example, when plurality of neurons 302 is pre-trained, neural network circuitry (e.g., neural network circuitry 110 of FIG. 1) may have stored a first previous cycle value (e.g., D(t−1)), a previous current value (e.g., i(t−1)), and a previous speed value (e.g., $\omega(t-1)$). In this example, the neural network circuitry may have determined a resulting speed value (e.g., $\omega(t)$), for example, using speed circuitry 222 of FIG. 2.

In this example, system 300 may have generated a first training vector to include the previous cycle value as a training cycle value, the previous current value as a current value, the previous speed value as a current speed value, and the resulting speed value as a target speed. In the example of FIG. 3, system 300 may have generated the first training vector to include one or more of a second previous current value (e.g., i(t−2)) or a second previous speed value (e.g., $\omega(t-2)$). System 300 may have generated the first training vector to include one or more of a third previous current value (e.g., i(t−3)) or a third previous speed value (e.g., $\omega(t-3)$). System 300 may have generated the first training vector to include one or more of a second previous cycle value (e.g., D(t−2)), a third previous cycle value (e.g., D(t−3)), or a fourth previous cycle value (e.g., D(t−4)).

System 300 may be configured to have generated the plurality of training vectors based on a range of target speed values for motor 306. For example, neural network circuitry may have generated the plurality of training vectors to help to ensure that motor 306 is within a predetermined range of speed values for motor 306. In this way, the neural network circuitry may be configured to have driven motor 306 to speed values to prevent damage to motor 306 and/or to represent a range of expected speed values for a particular application of motor 306.

System 300 may be configured to have generated the plurality of training vectors based on a range of target current values for motor 306 that have been determined based on a range of torque values. For example, the neural network circuitry may be configured to have converted a received range of torque values to a range of current values using a predetermined factor (e.g., a torque constant). In this way, system 300 may be configured to have driven motor 306 to prevent damage to motor 306 and/or to represent a range of expected torque values for a particular application of motor 306.

System 300 may be configured to have trained plurality of neurons 302 to minimize an error between the cycle value and a training cycle value for each training vector of a plurality of training vectors. For example, system 300 may have trained plurality of neurons 302 using the first training vector. In this example, system 300 may be configured to have generated a second training vector. For example, system 300 may effectively "shift" current values, speed values, and/or cycle values and repeat the process for generating the first training vector. For instance, system 300 may have used the first previous cycle value (e.g., D(t−1)) for the first training vector as a second previous cycle value (e.g., D(t−2)) for the second training vector, may have used the previous current value (e.g., i(t−1)) for the first training vector as a second previous current value (e.g., i(t−2)) for the second training vector, may have used the previous speed value (e.g., ω(t−1)) for the first training vector as a second previous speed value (e.g., ω(t−2)) for the second training vector, and so on. In this way, system 300 may operate with less memory storage consumption compared to systems that batch train neurons using multiple training vectors.

While the above example referred plurality of neurons 302 being pre-configured, in some examples, plurality of neurons 302 may be untrained and system 300 may train plurality of neurons 302 in real time. For example, system 300 may be configured to generate a plurality of training vectors and train plurality of neurons 302 to generate the cycle value to minimize the error between the cycle value and the training cycle value for each training vector of the plurality of training vectors.

In some examples, neural network circuitry may determine a previous speed value (e.g., ω(t−1)) associated with motor 306 at a first previous time (e.g., t−1), determine a previous current value (e.g., i(t−1)) associated with motor 306 at the first previous time, determine a previous cycle value (e.g., D(t−2)) for motor 306 at a second previous time (e.g., t−2) that occurs before the first previous time (e.g., t−1), and output, at a current time (e.g., t) that occurs after the previous time, the training cycle value (e.g., D(t−1)) to motor circuitry 312. In these examples, the neural network circuitry may determine a resulting speed value (e.g., ω(t)) associated with motor 306 that occurs when the training cycle value (e.g., D(t−1)) has been output to motor circuitry 312. In this example, the neural network circuitry is configured to train plurality of neurons 302 to generate, based on the previous speed value (e.g., D(t−1)), the previous current value (e.g., i(t−1)), the previous cycle value (e.g., D(t−2)), and the resulting speed value e.g., ω(t)), the cycle value to correspond to the training cycle value (e.g., D(t−1)).

In the example of FIG. 3, system 300 may generate the training vector to include one or more of a second previous current value (e.g., i(t−2)) or a second previous speed value (e.g., ω(t−2)). System 300 may generate the training vector to include one or more of a third previous current value (e.g., i(t−3)) or a third previous speed value (e.g., ω(t−3)). System 300 may generate the training vector to include one or more of a second previous cycle value (e.g., D(t−2)), a third previous cycle value (e.g., D(t−3)), or a fourth previous cycle value (e.g., D(t−4)). In some examples, system 300 may generate the training vector to omit the previous cycle value (e.g., D(t−2)).

System 300 may be configured to generate the plurality of training vectors based on a range of target speed values for motor 306. For example, system 300 may generate the plurality of training vectors to help to ensure that motor 306 is within a predetermined range of speed values for motor 306. In this way, system 300 may be configured to drive motor 306 to speed values to prevent damage to motor 306 and/or to represent a range of expected speed values for a particular application of motor 306.

System 300 may be configured to generate the plurality of training vectors based on a range of target current values for motor 306 that have been determined based on a range of torque values. For example, system 300 may be configured to convert a received range of torque values to a range of current values using a predetermined factor (e.g., a torque constant). In this way, system 300 may be configured to drive motor 306 to prevent damage to motor 306 and/or to represent a range of expected torque values for a particular application of motor 306.

While the example of FIG. 3 illustrates three current values, four speed values, and three cycle values, in some examples plurality of neurons 312 may use different values. For example, plurality of neurons 302 may use one, two, three, or more than four speed values. In some examples, plurality of neurons 302 may use one, two, or more than three current values. Plurality of neurons 302 may use zero, one, two, or more than three cycle values. In some cases, plurality of neurons 302 may also use additional information not shown to generate a cycle value.

Figure 4:
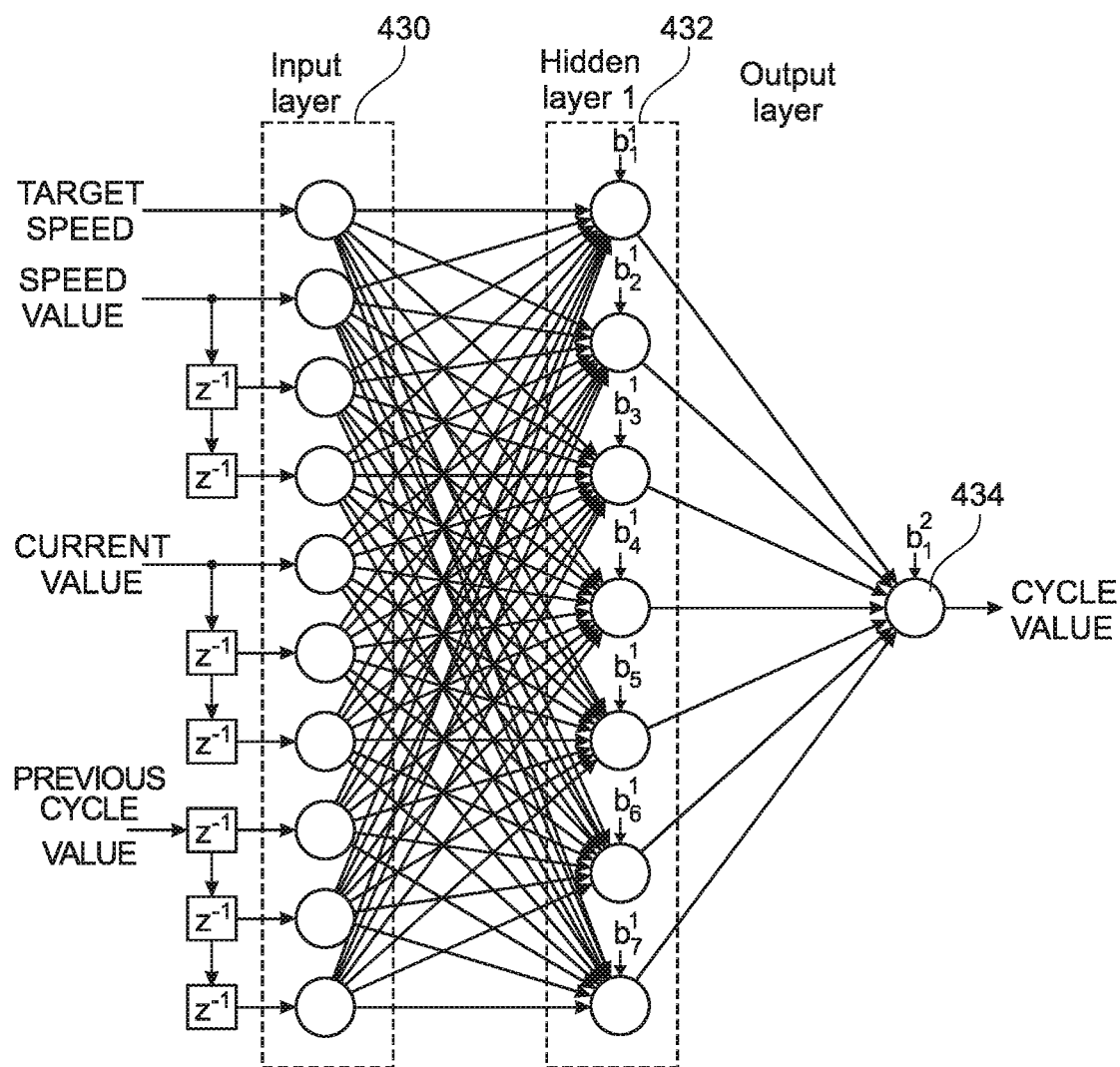
FIG. 4 is a block diagram illustrating an example plurality of neurons, in accordance with one or more techniques of this disclosure.

FIG. 4 is a block diagram illustrating an example plurality of neurons, in accordance with one or more techniques of this disclosure. As shown, input layer 430 may include an input layer configured to receive a target speed, one or more speed values (e.g., ω(t), ω(t−1), ω(t−2), and/or other speed values), one or more current values (e.g., i(t), i(t−1), i(t−2), and/or other current values), and one or more cycle values (e.g., D(t−1), D(t−2), D(t−3), and/or other cycle values). In some examples, input layer 430 may include fewer inputs. For instance, input layer 430 may omit previous cycle values. In some instances, input layer 403 may include only a target speed, one speed value, and one current value.

In the example of FIG. 4, hidden layer 432 includes seven neurons. However, in some examples, hidden layer 432 may include fewer neurons (e.g., less than seven neurons) or more neurons (e.g., more than seven neurons). Each neuron of hidden layer 432 may be associated with a weight illustrated as $b_1, b_2, \ldots b_7$. Each neuron of hidden layer 432 may generate an output based on input layer 430. In this example, the output of each neuron of input layer 430 is multiplied by a respective weight to generate a weighted output value. Output layer 434 may output a cycle value based on a summation of the weighted output values output by each neuron of input layer 430. In this example, output layer 434 includes one node (e.g., for a cycle value), however, in other examples, output layer 434 may include one or more additional nodes.

Figure 5:
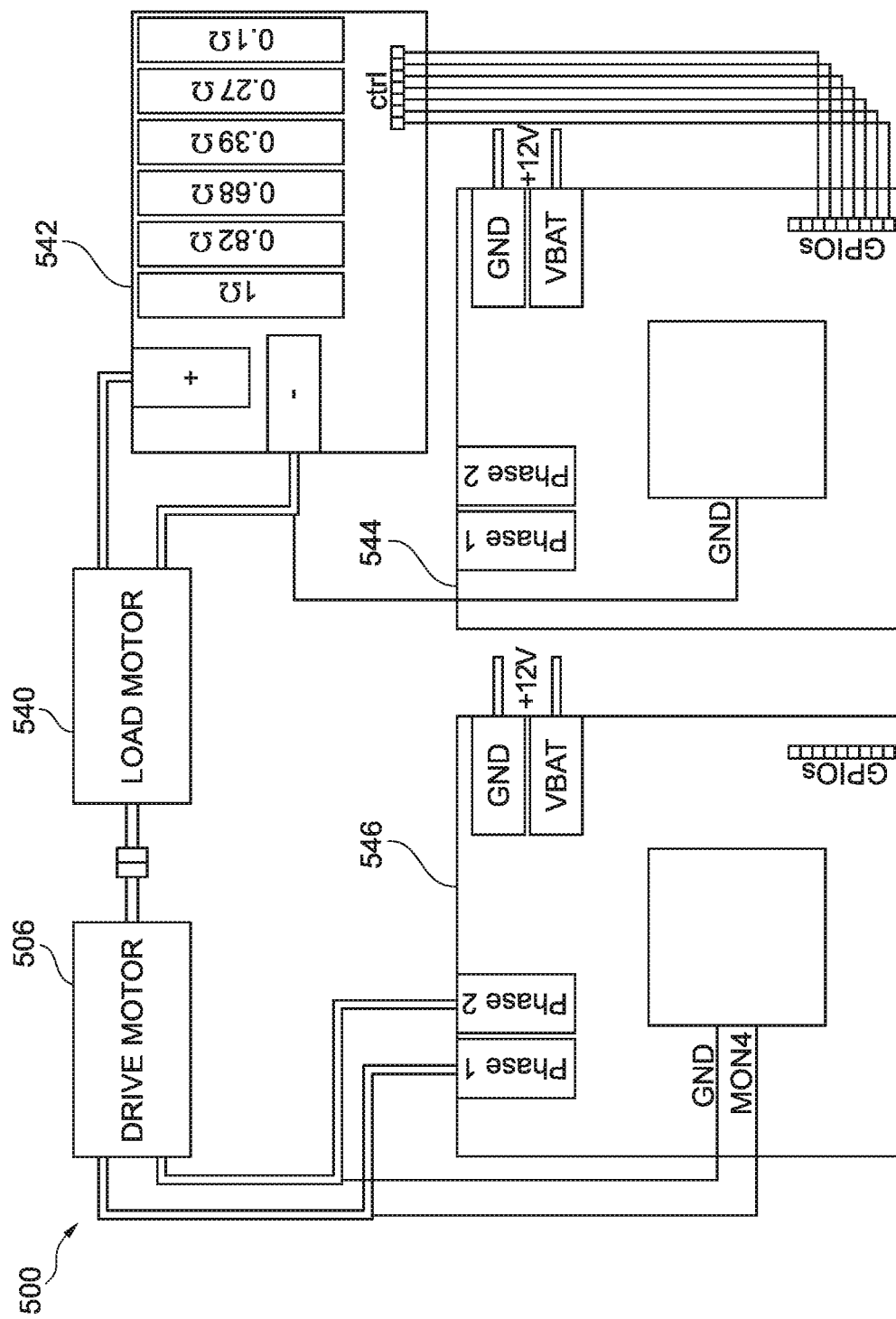
FIG. 5 is a block diagram illustrating an example setup for training a plurality of neurons, in accordance with one or more techniques of this disclosure.

FIG. 5 is a block diagram illustrating an example setup for training a plurality of neurons, in accordance with one or more techniques of this disclosure. A first circuit board 546 may be an example of a combination of plurality of neurons 102, motor circuitry 112, supply 101, and set of switching elements 114 of FIG. 1.

First circuit board 546 may be an example of motor control circuitry formed using an evaluation board including the system-on-chip with the microcontroller, a set of switching elements (e.g., power MOSFETs) to drive, using neural network circuitry, drive motor 506. In the example of FIG. 5, the neural network may be realized in embedded software stored in memory of the microcontroller of first circuit board 546. The embedded software for realizing the neural network may include a library to train and execute a plurality of neurons. Drive motor 506 may be an example of motor 106 of FIG. 1. Second circuit board 544 with resistor board 542 may be configured to drive load motor 540 (e.g., a DC motor) to act as a variable mechanical load.

In accordance with the techniques of the disclosure, a plurality of neurons of first circuit board 546 may be configured to be trained to generate a cycle value to minimize an error between the cycle value and a training cycle value for each training vector of a plurality of training vectors. First circuit board 546 may include a PWM generator that converts the cycle value into a pulse-width modulated duty cycle. The set of switching elements of first circuit board 546 may control (e.g., drive) drive motor 506 using the pulse-width modulated duty cycle.

Rather than training the plurality of neurons of first circuit board 546 at a constant load, second circuit board 544 may be configured to drive load motor 540, which includes a rotor mechanically coupled to a rotor of drive motor 506, to apply a variable mechanical load to drive motor 506. For example, second circuit board 544 may select (e.g., switch-in) a first set of resistors of resistor board 542 corresponding to a first predetermined mechanical load. In this example, first circuit board 546 may generate a first training vector when second circuit board 544 selects the first set of resistors for the first predetermined mechanical load. In this example, second circuit board 544 may select (e.g., switch-in) a second set of resistors of resistor board 542 corresponding to a second predetermined mechanical load that is greater than or less than the first predetermined mechanical load. In this example, first circuit board 546 may generate a second training vector when second circuit board 544 selects the second set of resistors for the second predetermined mechanical load. In this way, the plurality of neurons may be trained to account for different loading at drive motor 506 when drive motor 506 is in-service (e.g., mechanically coupled to a varying load that is not preconfigured).

Figure 6:
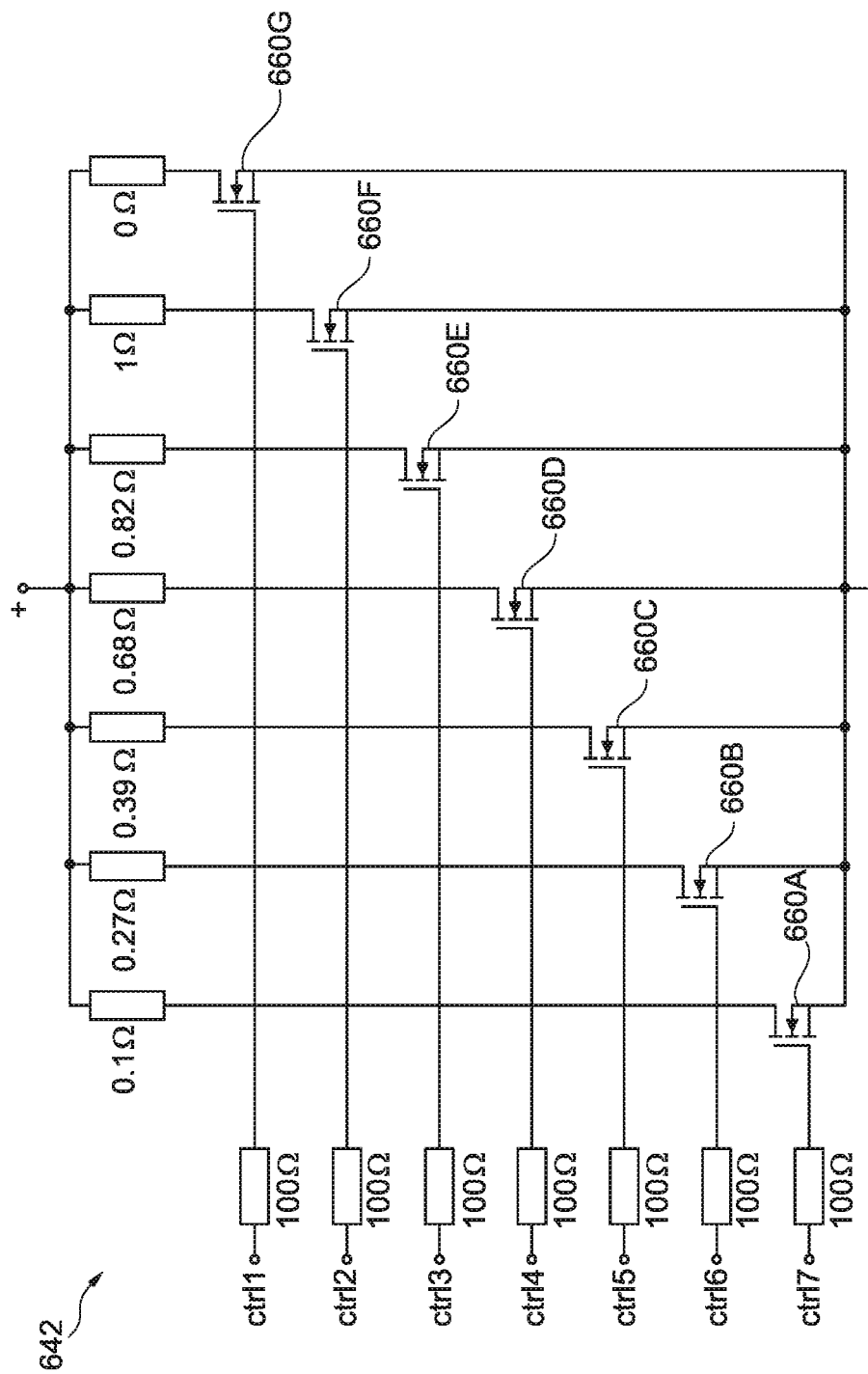
FIG. 6 is a conceptual diagram illustrating an example resistor board for training a plurality of neurons, in accordance with one or more techniques of this disclosure.

FIG. 6 is a conceptual diagram illustrating an example resistor board 642 for training a plurality of neurons, in accordance with one or more techniques of this disclosure. Resistor board 642 may be an example of resistor board 542 of FIG. 5. As shown, resistor board 642 includes switching elements 60A-660G (collectively, "switching elements 660"). Second circuit board 544 of FIG. 5 is discussed with respect to FIG. 6 for example purposes only.

Second circuit board 544 may switch-in a first set of switching elements 660 to generate a first predetermined mechanical load. For example, second circuit board 544 may switch-in switching elements 660A-660C and switch-out switching elements 660D-660G to generate a first resistance value. In this example, second circuit board 544 may drive load motor 540 using the first resistance value to provide a first predetermined mechanical load. Second circuit board 544 may switch-in switching element 660A and switch-out switching elements 660B-660G to generate a second resistance value. In this example, second circuit board 544 may drive load motor 540 using the second resistance value to provide a second predetermined mechanical load. In this way, resistor board 642 may help to provide resistance values to drive load motor 540 with a preconfigured variable mechanical load.

Figure 7:
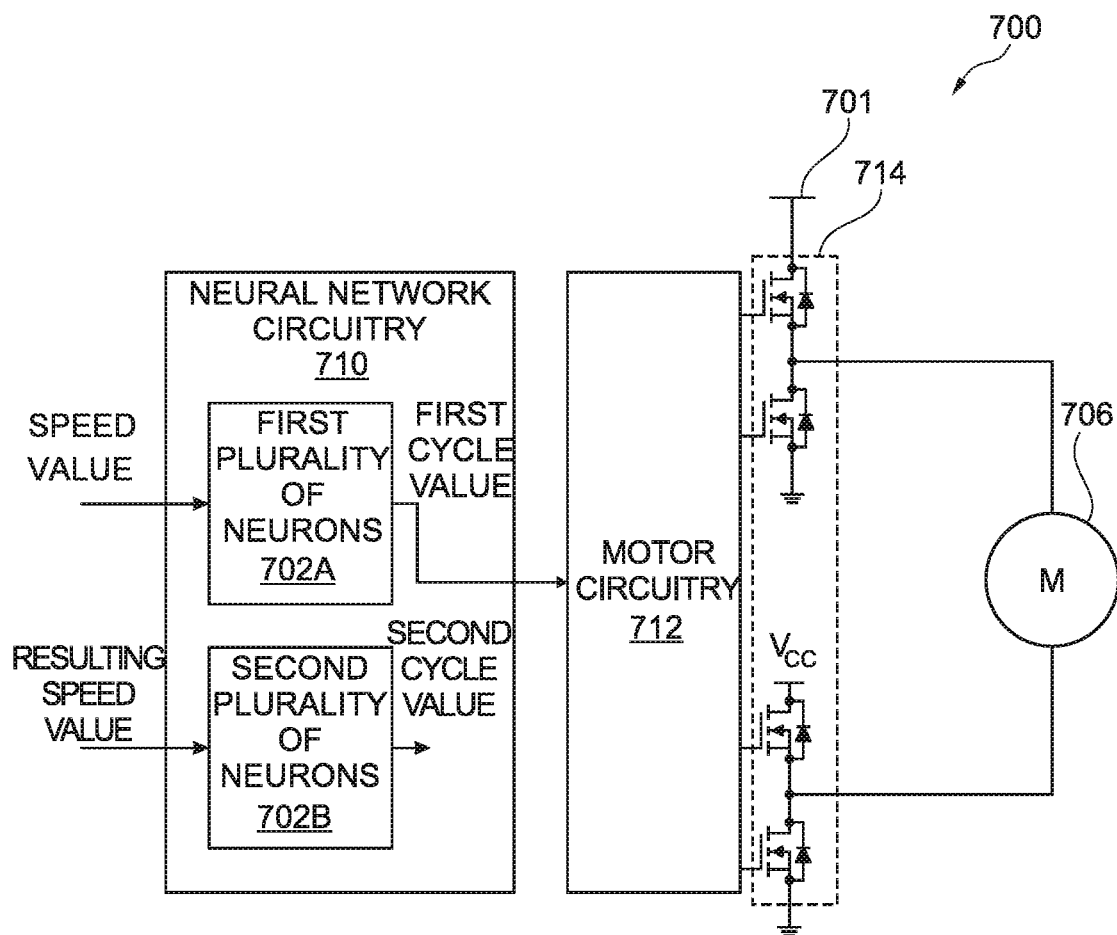
FIG. 7 is a block diagram illustrating an example first system configured for driving a motor using a first plurality of neurons and a second plurality of neurons, in accordance with one or more techniques of this disclosure.

FIG. 7 is a block diagram illustrating an example first system configured for driving a motor using a first plurality of neurons and a second plurality of neurons, in accordance with one or more techniques of this disclosure. Neural network circuitry 710, motor circuitry 712, set of switching elements 714, supply 701, and motor 706 may be examples of neural network circuitry 110, motor circuitry 112, set of switching elements 114, supply 101, and motor 106 of FIG. 1.

System 700 of FIG. 7 may be an adaptive system and may include two neural networks (e.g., first plurality of neurons 702A and second plurality of neurons 702B). First plurality of neurons 702A may be trained and introduced in the motor regulation loop. First plurality of neurons 702A may receive input signals (e.g., one or more speed values, one or more current values, and/or other values) from motor 706 and generate a first cycle value. Motor circuitry 712 may generate, based on the first cycle value, a digital modulation signal (e.g., a PWM duty cycle) to control motor 706. Second plurality of neurons 702A may comprise a copy of first plurality of neurons 702A.

As described in further details below, first plurality of neurons 702A may receive a target speed as an input. In some examples, first plurality of neurons 702A may receive values (e.g., a current value, a speed value, and/or another value) and historical values (e.g., one or more previous current values, one or more previous speed values, one or more previous cycle values, and/or another value). Second plurality of neurons 702A may receive the same values (e.g., one or more current values, one or more speed values, one or more cycle values, and/or another value) delayed. However, second plurality of neurons 702A may receive the resulting speed (e.g., based on motor BEMF voltage) instead of the target speed.

Neural network circuitry 710 may use a delta (e.g., a difference value) of the output of first plurality of neurons 702A and second plurality of neurons 702B as an error measure which may be used to adapt second plurality of neurons 702B which is not in the regulation loop. When the error is sufficiently low, second plurality of neurons 702B is exchanged against first plurality of neurons 702A and the copy of second plurality of neurons 702A may be again adapted in the same way as before. For instance, neural network circuitry 710 may set second plurality of neurons 702B to become first plurality of neurons 702A and set first plurality of neurons 702A to become second plurality of neurons 702B. With this implementation system 700 may continuously adjust and assess the error. Neural network circuitry 710 may asses the error in the background of the regulation. For example, neural network circuitry 710 may asses the error without interrupting the regulation of motor 706 by first plurality of neurons 702A. In this way, neural network circuitry 710 may optimize and adapt based on error (e.g., a difference) between the actual setup and the ideal setup, which may improve an accuracy of system 700 compared to motor controllers using programmed motor controllers and/or statically implemented neural networks.

Neural network circuitry 710 may include first plurality of neurons 702A and second plurality of neurons 702B. First plurality of neurons 702A may be an example of plurality of neurons 102 of FIG. 1. Second plurality of neurons 702B may similar to first plurality of neurons 702B. For example, first plurality of neurons 702A and second plurality of neurons 702B may include an input layer configured to receive one or more of a target speed, one or more speed values, one or more current values, or one or more previous cycle values. First plurality of neurons 702A and second plurality of neurons 702B may include a hidden layer with less than seven neurons, seven neurons, more than seven neurons, or other numbers of neurons.

First plurality of neurons 702A may be configured to generate a first cycle value based on a target speed. First plurality of neurons 702A may be configured to generate the first cycle value further based on additional values, for example, one or more speed values, one or more current values, one or more cycle values, or other values.

Motor circuitry 712 may be configured to control, based on the first cycle value, set of switching elements 714 to drive motor 706. For example, motor circuitry 712 may include circuitry configured to generate, based on the cycle value (e.g., a duty cycle value), a digital modulated signal. Motor circuitry 712 may be configured to drive, based on the digital modulated signal, set of switching elements 714 to operate in at least a first switching state and a second switching state. During the first switching state, set of switching elements 714 may electrically couple a first terminal of motor 706 and a first supply terminal (e.g., a positive terminal or a negative terminal) of supply 701 and electrically couples a second terminal of the motor and a second supply terminal (e.g., a negative terminal or a positive terminal) of supply 701. During the second switching state, set of switching elements 714 may electrically couple the second terminal of the motor and the first supply terminal (e.g., a positive terminal or a negative terminal) of supply 701 and may electrically couple the first terminal of the motor and the second supply terminal (e.g., a negative terminal or a positive terminal) of supply 701.

Some systems may train neurons at manufacturing and/or when initially placing a motor controller in-service. However, various parameters (e.g., mechanical, electrical, and/or other parameters) of the system may change while the system is in service. Such changes in parameters may reduce an accuracy of the neurons over time.

In accordance with the techniques of the disclosure, neural network circuitry 710 may not be static (e.g., maintain an initial training of neurons). Instead, neural network circuitry 710 may be configured to adapt and "learn on the fly" while system 700 is in-service. When system 700 changes because of mechanical changes or changes of elements, neural network circuitry 710 may be configured to learn from the behavior of the new setup and while neural network circuitry 710 controls, for example, a speed or a torque at motor 706. For example, neural network circuitry 710 may be configured to compare an actual setup (e.g., corresponding to system 700 in-service) with an ideal setup (e.g., corresponding to system 700 when manufactured and/or when initially placed in-service). Techniques described herein may configure neural network circuitry 710 to optimize and adapt based on error (e.g., a difference) between the actual setup and the ideal setup, which may improve an accuracy of system 700 compared to motor controllers using programmed motor controllers and/or statically implemented neural networks.

Second plurality of neurons 702B may be configured to train second plurality of neurons 702B to generate, based on a resulting speed value (e.g., $\omega(t)$) for motor 706 that occurs when motor circuitry 712 has controlled set of switching elements 714 to drive motor 706 based on the first cycle value, a second cycle value to minimize a difference between the second cycle value and the first cycle value. For example, neural network circuitry 712 may determine one or more of a previous speed value (e.g., $\omega(t-1)$) associated with motor 706 at a first previous time (e.g., t−1), a previous current value (e.g., i(t−1)) associated with motor 306 at the first previous time, a previous cycle value (e.g., D(t−2)) for motor 306 at a second previous time (e.g., t−2) that occurs before the first previous time (e.g., t−1). In this example, first plurality of neurons 702A may output, at a current time (e.g., t) that occurs after the previous time, the first cycle value (e.g., D(t−1)) to motor circuitry 712 to drive motor 706. In this example, neural network circuitry 710 may determine the resulting speed value (e.g., $\omega(t)$) associated with motor 706 that occurs when the first cycle value (e.g., D(t−1)) has been output to motor circuitry 712 to drive motor 706. In this example, neural network circuitry 712 may be configured to train second plurality of neurons 702B to generate, based on the resulting speed value e.g., $\omega(t)$), the second cycle value to minimize a difference between the second cycle value (e.g., the cycle value output by second plurality of neurons 702B) and the first cycle value (e.g., D(t−1)).

In this way, second plurality of neurons 702B may train in-real time and while system 700 is operating in-service in order to help account for mechanical changes, electrical changes, and/or other changes in system 700. For example, neural network circuitry 710 may adapt and learn how to regulate optimally when motor 706 is exchanged, when one or more ball rings of motor 706 dry out, when mechanical wear out takes place at motor 706, and/or in response to other changes in system 700. Neural network circuitry 710 may adapt and learn how to regulate optimally in response to changes in system 700 autonomously (e.g., without human user interaction and/or without software adjustment).

Figure 8:
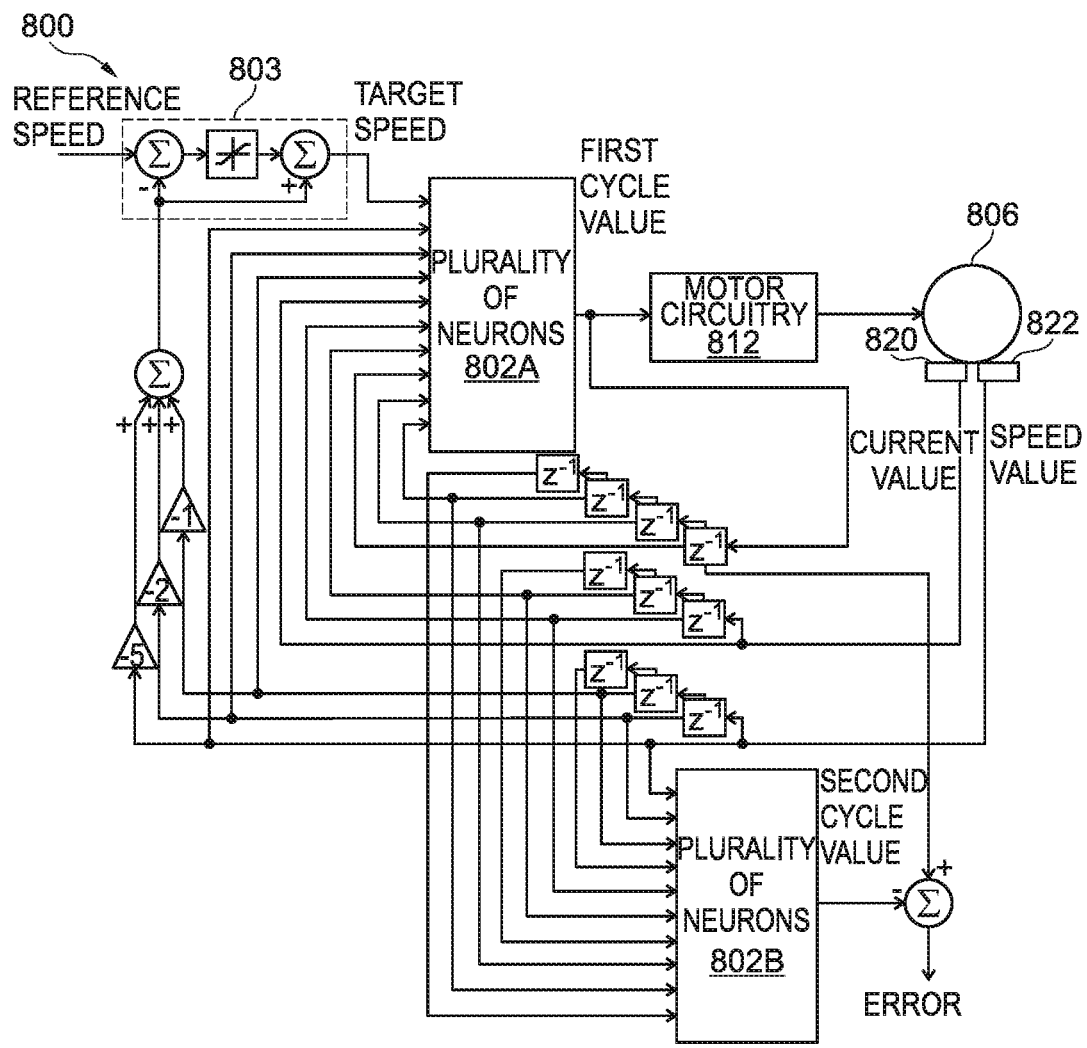
FIG. 8 is a block diagram illustrating an example system configured for training a second plurality of neurons, in accordance with one or more techniques of this disclosure.

FIG. 8 is a block diagram illustrating an example system 800 configured for training a second plurality of neurons 802B, in accordance with one or more techniques of this disclosure. First plurality of neurons 802A, motor circuitry 812, and motor 806 may be examples of plurality of neurons 102, motor circuitry 112, and motor 106 of FIG. 1. Maximum speed delta circuitry 803, current circuitry 820, and speed circuitry 822 may be examples of maximum speed delta circuitry 203, current circuitry 220, and speed circuitry 222 of FIG. 2. Second plurality of neurons 802B may be an example of second plurality of neurons 702B of FIG. 7. First plurality of neurons 802A and second plurality of neurons 802B may be collectively referred to herein as neural network circuitry 802, which may include circuitry in addition to first plurality of neurons 802A and second plurality of neurons 802B.

While first plurality of neurons 802A may generate the first cycle value in real-time, the proceeding examples refer to first plurality of neurons 802A as generating the first cycle value at time 't−1' and refers to the resulting speed value (e.g., $\omega(t)$) as occurring at time 't' for ease of description. Speed circuitry 822 may measure a back-electromagnetic force voltage at motor 806 when motor circuitry 812 has controlled set of switching elements 814 to drive motor 806 based on the first cycle value and determine the resulting speed value (e.g., ω(t)) for motor 806 based on the back-electromagnetic force voltage.

First plurality of neurons 802A may generate the first cycle value (e.g., D(t−1)) based on a target speed output by maximum speed delta circuitry 803. In some examples, first plurality of neurons 802A may generate the first cycle value based on the target speed and further based on one or more of a first speed value (e.g., ω(t−1)) for motor 806 at a first time (e.g., t−1) that occurs before motor circuitry 812 has controlled, based on the first cycle value, set of switching elements 814, a first current value (e.g., i(t−1)) for motor 806 at the first time (e.g., t−1), or a first previous cycle value (e.g., D(t−2)) used by motor circuitry 812 to control set of switching elements 814 at a second time (e.g., t−2) that occurred before the first time (e.g., t−1). In some examples, first plurality of neurons 802A may generate the first cycle value based on one or more of a second speed value (e.g., ω(t−2)) for motor 806 at a second time (e.g., t−2) that occurred before the first time (e.g., t−1), a second current value (e.g., i(t−2)) for motor 806 at the second time (e.g., t−2), or a second previous cycle value (e.g., D(t−3)) used by motor circuitry 812 to control set of switching elements 814 at a third time (e.g., t−3) that occurred before the second time (e.g., t−2).

In some examples, neural network circuitry 802 (e.g., first plurality of neurons 802A and second plurality of neurons 802B) may be configured to train second plurality of neurons 802B using the first cycle value. For example, neural network circuitry 802 may be configured to train second plurality of neurons 802B to generate, based on the resulting speed value (e.g., ω(t)), the second cycle value (e.g., D'(t−1)) to minimize a difference (e.g., error) between the second cycle value (e.g., the cycle value output by second plurality of neurons 802B) and the first cycle value (e.g., D(t−1)). The difference (e.g., error) between the second cycle value (e.g., the cycle value output by second plurality of neurons 802B) and the first cycle value (e.g., D(t−1)) is input to neural network circuitry 802 and used, by neural network circuitry 802, to adapt the second plurality of neurons 802B.

In some examples, second plurality of neurons 802B may generate the second cycle value based on the resulting speed value (e.g., ω(t)) and based further on one or more of: one or more current values (e.g., i(t−1), i(t−2), i(t−3), and/or other current values), one or more speed values (e.g., ω(t−1), ω(t−2), ω(t−3), and/or other speed values), and one or more previous cycle values (e.g., D(t−2), D(t−3), D(t−4), and/or other cycle values).

For example, second plurality of neurons 802B may generate the second cycle value based on the resulting speed value (e.g., ω(t)) and further based on one or more of a first speed value (e.g., ω(t−1)) for motor 806 at a first time (e.g., t−1) that occurs before motor circuitry 812 has controlled, based on the first cycle value, set of switching elements 814, a first current value (e.g., i(t−1)) for motor 806 at the first time (e.g., t−1), or a first previous cycle value (e.g., D(t−2)) used by motor circuitry 812 to control set of switching elements 814 at a second time (e.g., t−2) that occurred before the first time (e.g., t−1). In some examples, second plurality of neurons 802B may generate the second cycle value based on one or more of a second speed value (e.g., ω(t−2)) for motor 806 at a second time (e.g., t−2) that occurred before the first time (e.g., t−1), a second current value (e.g., i(t−2)) for motor 806 at the second time (e.g., t−2), or a second previous cycle value (e.g., D(t−3)) used by motor circuitry 812 to control set of switching elements 814 at a third time (e.g., t−3) that occurred before the second time (e.g., t−2).

Neural network circuitry 802 may be configured to adapt to changes in system 800. For example, in response to determining that the difference between the second cycle value and the first cycle value is less than an error threshold (e.g., a preconfigured threshold, a determined threshold, and/or another error threshold), the neural network circuitry is configured to copy second plurality of neurons 802B into first plurality of neurons 802A such that the first plurality of neurons generates the first cycle value to correspond to the second cycle value generated by second plurality of neurons 802B when the resulting speed value corresponds to the target speed. For example, the neural network circuitry is configured to replace first values of weights of a hidden layer (e.g., $b_1, b_2, \ldots b_7$ of FIG. 4) of first plurality of neurons 802A with second values of corresponding weights of the hidden layer of second plurality of neurons 802B.

Figure 9:
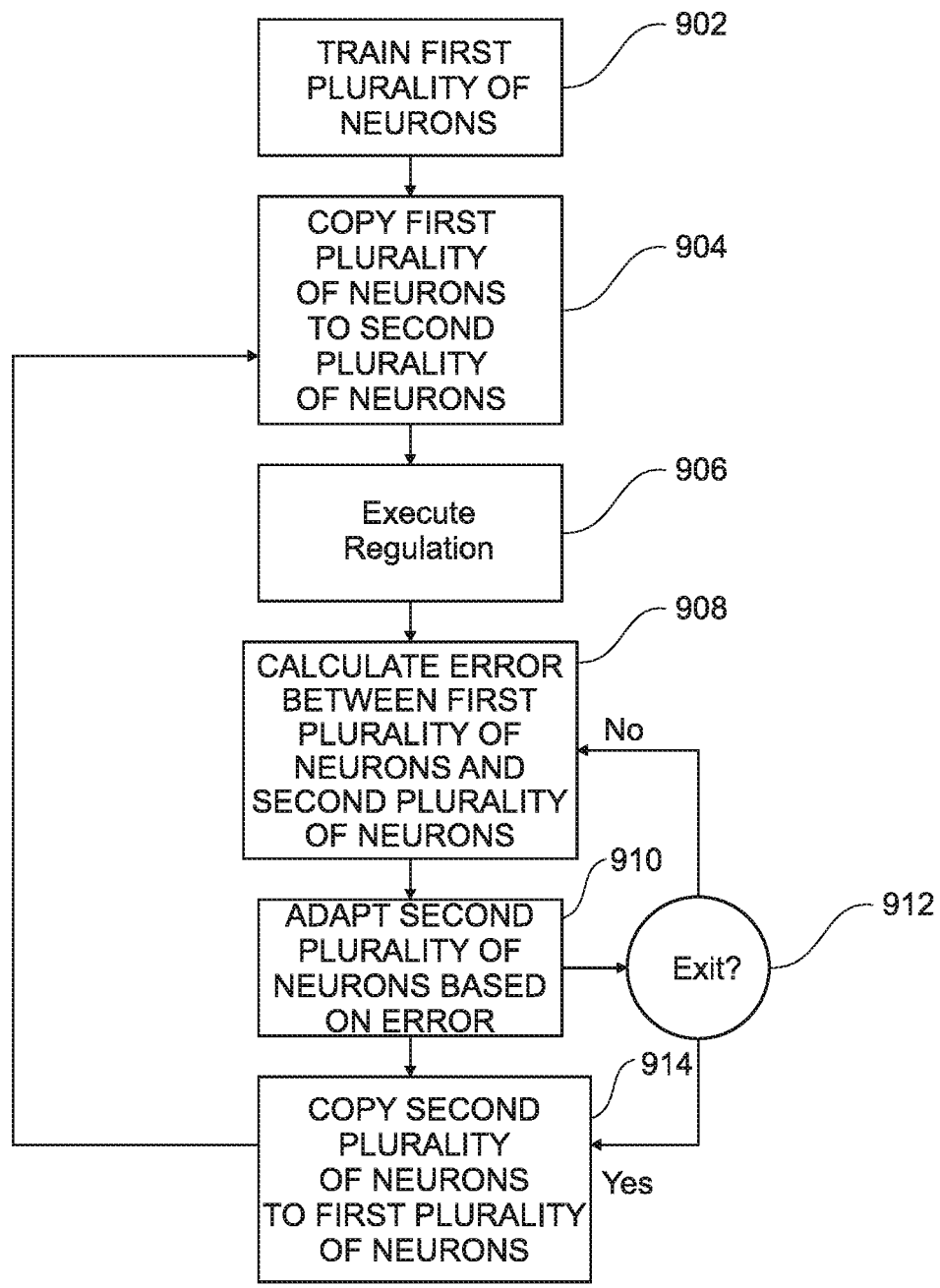
FIG. 9 is a flow diagram for training a second plurality of neurons, in accordance with one or more techniques of this disclosure.

FIG. 9 is a flow diagram for training a second plurality of neurons, in accordance with one or more techniques of this disclosure. The example operations of FIG. 9 are described below within the context of FIGS. 1-8 for example purposes only. Neural network circuitry 710 may train first plurality of neurons 702A (902). For example, neural network circuitry 710 may train first plurality of neurons 702A in accordance with techniques described in FIG. 3 and/or FIG. 5. For instance, neural network circuitry 710 may train first plurality of neurons 702A when a predetermined variable mechanical load is applied to motor 706. In some examples, the predetermined variable mechanical load may be applied by a load motor (e.g., load motor 540) using a resistor board (e.g., resistor board 542). For instance, each different combination of resistors switched-in may correspond to a different predetermined variable mechanical load. In some examples, second plurality of neurons 702B may be configured to refrain from training when the predetermined variable mechanical load is applied to motor 706.

Neural network circuitry 710 may copy the first plurality of neurons 702A to second plurality of neurons 702B (904). For example, neural network circuitry 710 may be configured to replace first values of weights of a hidden layer (e.g., $b_1, b_2, \ldots, b_7$ of FIG. 4) of first plurality of neurons 702A with second values of corresponding weights of the hidden layer of second plurality of neurons 702B.

Neural network circuitry 710 executes regulation (906). For example, first plurality of neurons 702A may generate a first cycle value based on a target speed. First plurality of neurons 702A may be configured to generate the first cycle value further based on additional values, for example, one or more speed values, one or more current values, one or more cycle values, or other values.

Neural network circuitry 710 may calculate an error between first plurality of neurons 702A and second plurality of neurons 702B (908). For example, neural network circuitry 710 may calculate a difference between the first duty cycle generated by first plurality of neurons 702A at a previous time (e.g., t−1) and the second duty cycle generated by second plurality of neurons 702B at a particular time (e.g., t).

Neural network circuitry 710 may adapt second plurality of neurons 702B based on the error (910). For example, second plurality of neurons 702B may be configured to train, when the predetermined variable mechanical load is not applied to the motor, second plurality of neurons 702B to generate, based on a resulting speed value for motor 706 that occurs when motor circuitry 712 has controlled set of switching elements 714 to drive motor 706 based on the first cycle value, a second cycle value to minimize a difference between the second cycle value and the first cycle value. For instance, second plurality of neurons 702B may be configured to train during when first plurality of neurons 702A generates a first cycle value based on a target speed and when motor 706 is coupled to a varying and unknown load and not coupled to a load motor.

Neural network circuitry 710 may determine whether a difference between the second cycle value and the first cycle value is less than an error threshold (e.g., a preconfigured threshold, a determined threshold, and/or another error threshold) (912). In response to determining that the difference between the second cycle value and the first cycle value is not less than the error threshold ("No" of 912), neural network circuitry 710 may proceed to step 908. In response, however, to determining that the difference between the second cycle value and the first cycle value is less than an error threshold ("Yes" of 912), neural network circuitry 710 may copy second plurality of neurons 702B to first plurality of neurons 702A and proceed to step 904 (914). For example, neural network circuitry 710 may copy second plurality of neurons 702B to first plurality of neurons 702A such that the first plurality of neurons generates the first cycle value to correspond to the second cycle value generated by second plurality of neurons 702B when the resulting speed value corresponds to the target speed. For instance, neural network circuitry 710 may be configured to replace first values of weights of a hidden layer (e.g., b1, b2, . . . , b7 of FIG. 4) of first plurality of neurons 702A with second values of corresponding weights of the hidden layer of second plurality of neurons 702B.

Figure 10:
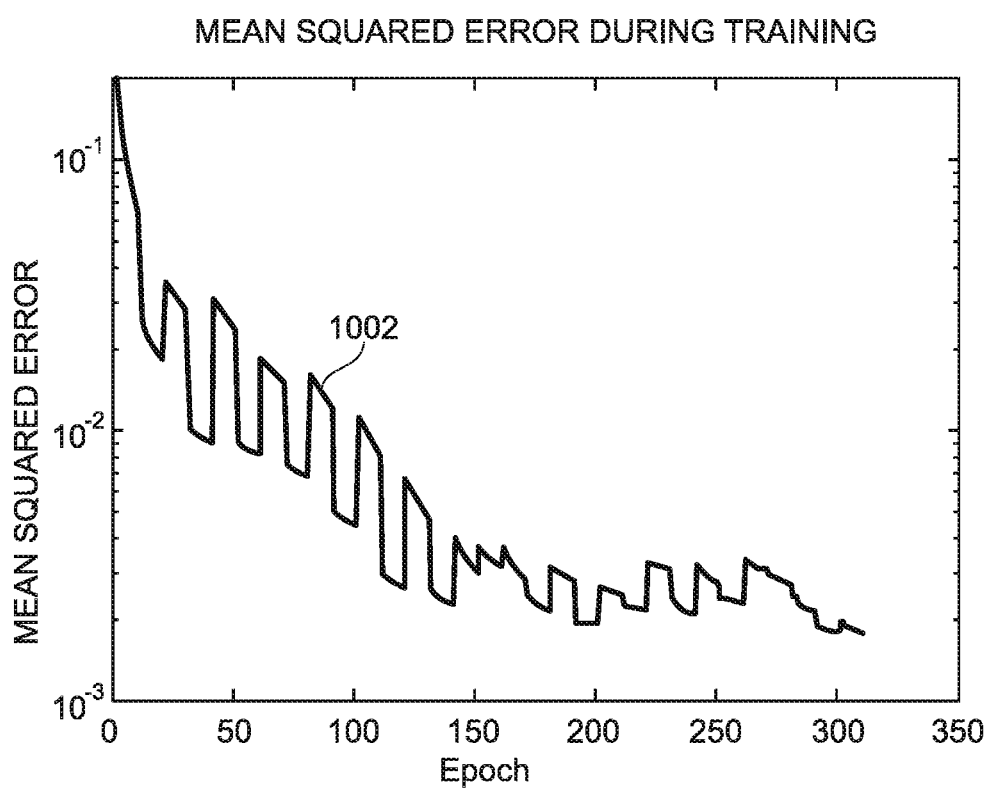
FIG. 10 is a graph illustrating of a mean squared error during training, in accordance with one or more techniques of this disclosure.

FIG. 10 is graph illustrating a mean squared error during training, in accordance with one or more techniques of this disclosure. FIG. 10 is discussed with reference to FIGS. 1-9 for example purposes only. The abscissa axis of FIG. 10 is time and the ordinate axis of FIG. 10 is a mean squared error 1002 of target speed and a resulting speed value at motor 106 during training of plurality of neurons 102. As shown, neural network circuitry 110 is configured to train plurality of neurons 102 to sufficiently reduce the mean squared error during training.

Figure 11:
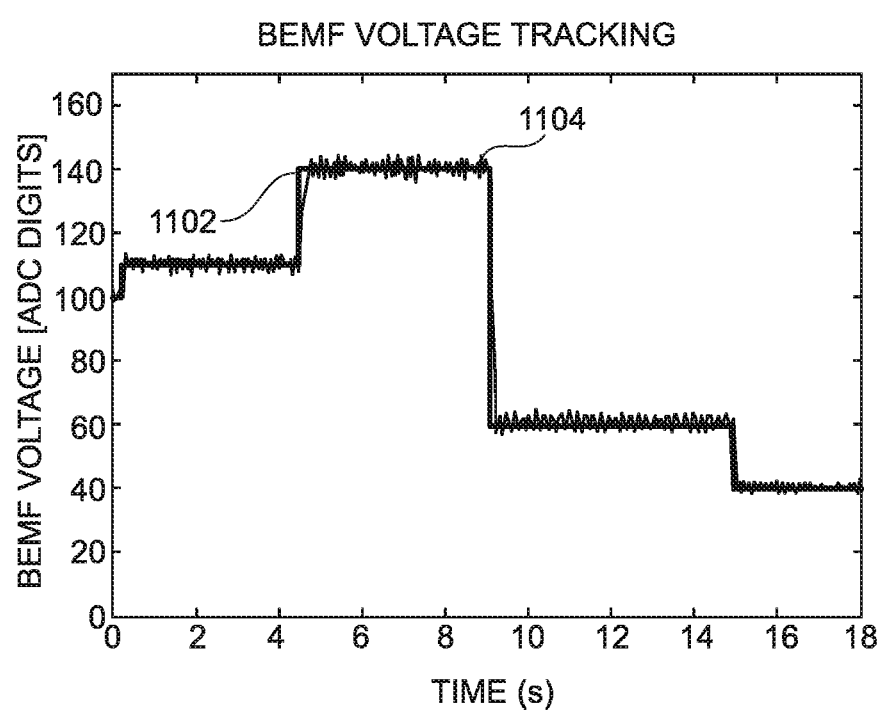
FIG. 11 is a graph illustrating a back-electromagnetic force (BEMF) voltage tracking, in accordance with one or more techniques of this disclosure.

FIG. 11 is a graph illustrating BEMF voltage tracking, in accordance with one or more techniques of this disclosure. FIG. 11 is discussed with reference to FIGS. 1-10 for example purposes only. The abscissa axis of FIG. 11 is time in seconds and the ordinate axis of FIG. 11 is a first BEMF voltage 1102 of a target speed and a second BEMF voltage 1104 of a resulting speed value at motor 106. As shown, neural network circuitry 110 is configured to closely regulate a rotor speed at motor 106 to a target speed.

Figure 12:
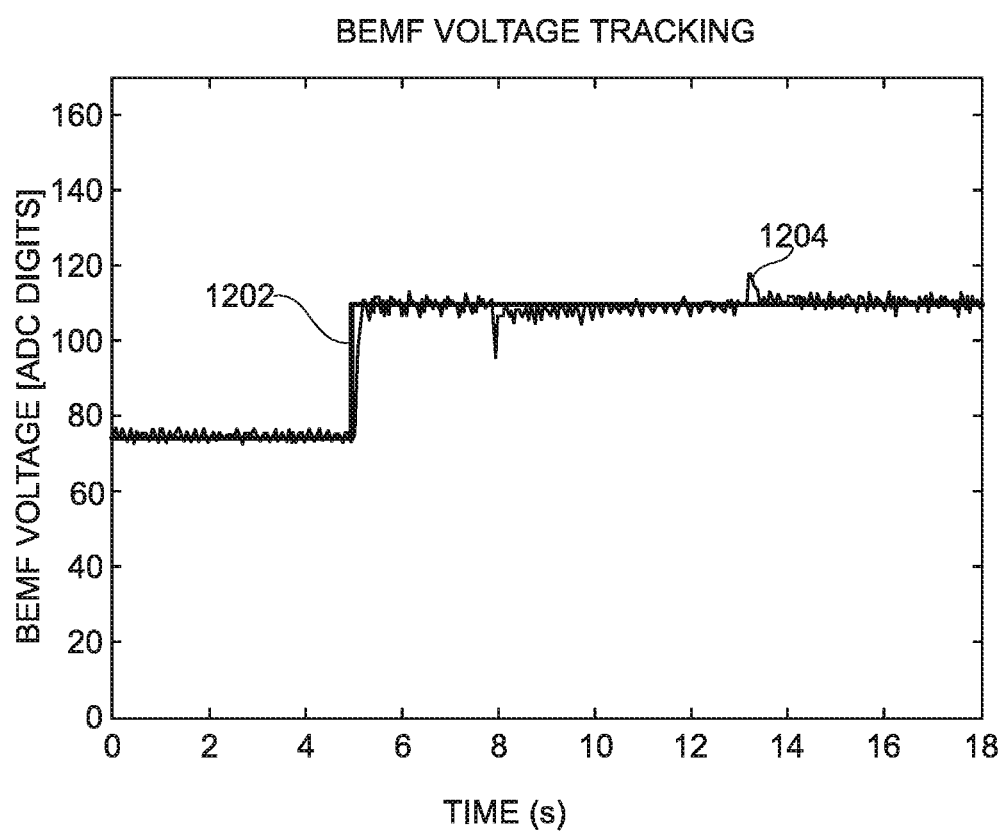
FIG. 12 is a graph illustrating a BEMF voltage tracking during load changes, in accordance with one or more techniques of this disclosure.

FIG. 12 is a graph illustrating BEMF voltage tracking during load changes, in accordance with one or more techniques of this disclosure. FIG. 12 is discussed with reference to FIGS. 1-11 for example purposes only. The abscissa axis of FIG. 12 is time in seconds and the ordinate axis of FIG. 12 is a first BEMF voltage 1202 of a target speed and a second BEMF voltage 1204 of a resulting speed value at motor 106. As shown, neural network circuitry 710 is configured to closely regulate, with first plurality of neurons 702A, a rotor speed at motor 706 to a target speed until a load change occurs at about 8 seconds. At 8 seconds, neural network circuitry 710 may continuously train and adapt second plurality of neurons 702B, which is copied into first plurality of neurons 702A to more closely regulate second BEMF voltage 1204 of a resulting speed value at motor 106 to correspond to first BEMF voltage 1202 of the target speed. At about 13 seconds, another load change occurs and neural network circuitry 710 may continuously train and adapt second plurality of neurons 702B, which is copied into first plurality of neurons 702A to more closely regulate second BEMF voltage 1204 of a resulting speed value at motor 106 to correspond to first BEMF voltage 1202 of the target speed. In this way, neural network circuitry 710 may optimize and adapt to account for changes in system 700 (e.g., motor 706), which may improve an accuracy of system 700 compared to motor controllers using programmed motor controllers and/or statically implemented neural networks.

Figure 13:
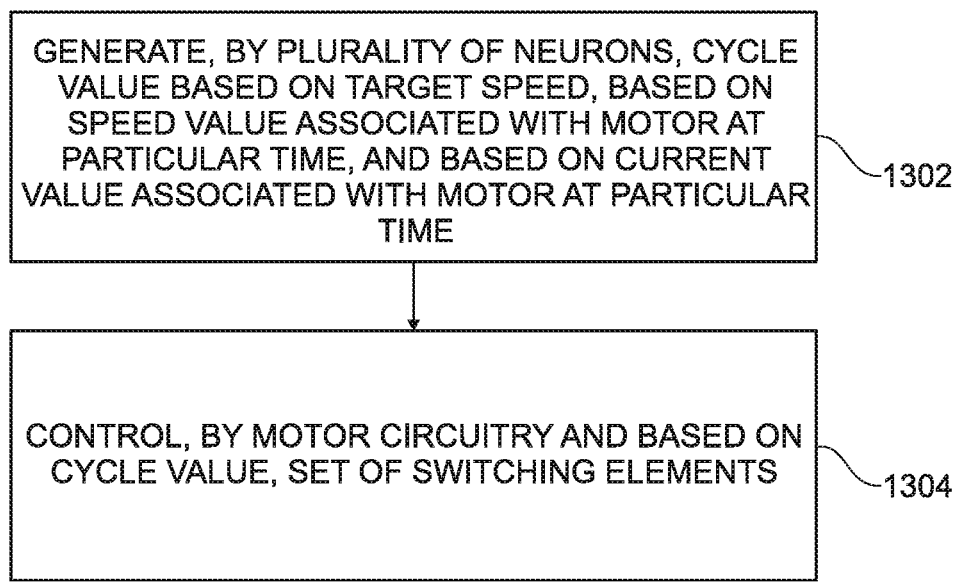
FIG. 13 is a flow diagram for driving a motor using neural network circuitry, in accordance with one or more techniques of this disclosure.

FIG. 13 is a flow diagram for driving a motor using neural network circuitry, in accordance with one or more techniques of this disclosure. FIG. 13 is discussed with reference to FIGS. 1-12 for example purposes only. Plurality of neurons 102 may generate a cycle value based on a target speed, based on a speed value associated with the motor at a particular time, and based on a current value associated with the motor at the particular time (1302). In some examples, plurality of neurons 102 may be configured to be trained to generate the cycle value to minimize an error between the cycle value and a training cycle value for each training vector of a plurality of training vectors.

In some examples, system 100 may be configured to have generated the plurality of training vectors. For example, system 100 may, without human interaction, have selected different starting motor speeds, different loads at motor 106, different cycle values, and/or other parameters to have generated training vectors of the set of training vectors. In some examples, system 100 may, without human interaction, be configured to select different starting motor speeds, different loads at motor 106, different cycle values, and/or other parameters to generate training vectors of the set of training vectors. Motor circuitry 212 may control, based on the cycle value, set of switching elements 114 to drive motor 106 (1304).

Figure 14:
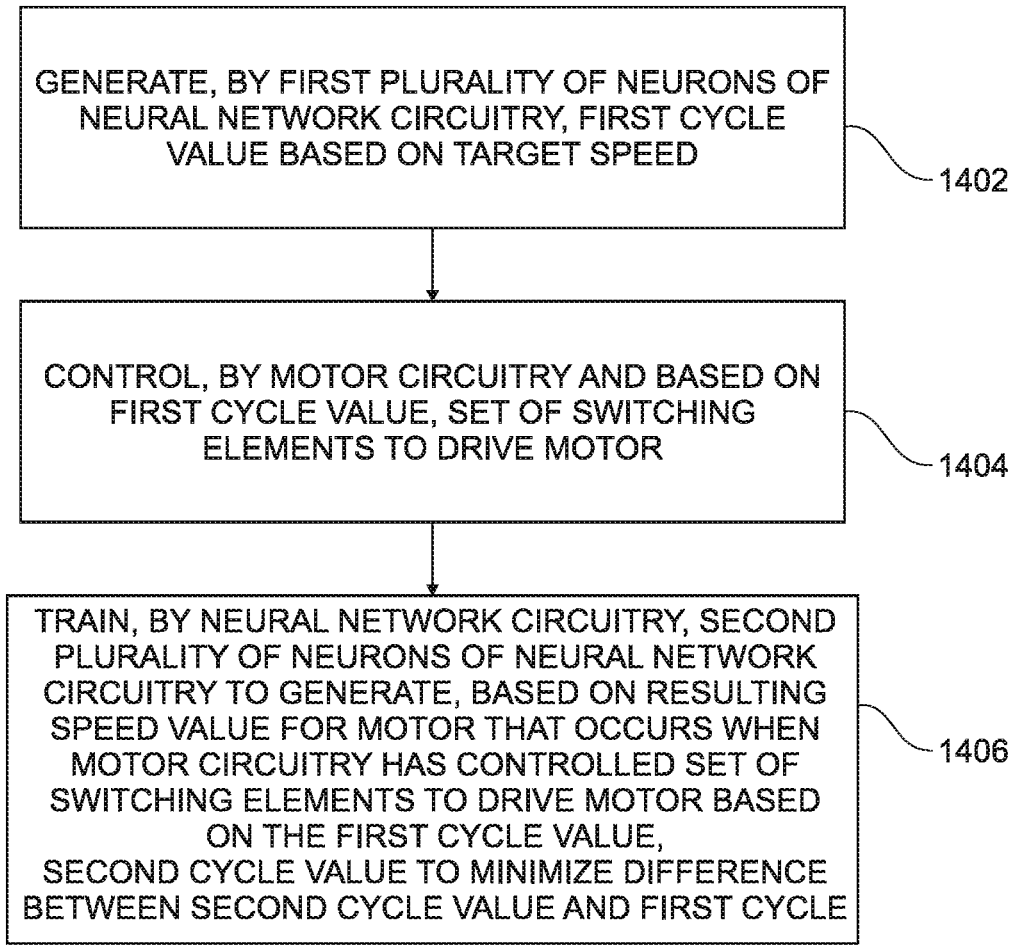
FIG. 14 is a flow diagram for driving a motor using a first plurality of neurons and a second plurality of neurons, in accordance with one or more techniques of this disclosure.

FIG. 14 is a flow diagram for driving a motor using a first plurality of neurons and a second plurality of neurons, in accordance with one or more techniques of this disclosure. FIG. 14 is discussed with reference to FIGS. 1-13 for example purposes only. First plurality of neurons 702A may generate a first cycle value based on a target speed (1402). In some examples, first plurality of neurons 702A may be configured to generate the first cycle value further based on additional values, for example, one or more speed values, one or more current values, one or more cycle values, or other values.

Motor circuitry 712 may control, based on the first cycle value, set of switching elements 714 to drive motor 706 (1404). Neural network circuitry 710 may train second plurality of the neurons 702B to generate, based on a resulting speed value for motor 706 that occurs when motor circuitry 712 has controlled set of switching elements 714 to drive motor 706 based on the first cycle value, a second cycle value to minimize a difference between the second cycle value and the first cycle value (1406).

The following examples may illustrate one or more aspects of the disclosure.

Example 1. An apparatus for driving a motor, the apparatus comprising: a first plurality of neurons of neural network circuitry configured to generate a first cycle value based on a target speed; motor circuitry configured to control, based on the first cycle value, a set of switching elements to drive the motor; and a second plurality of neurons of the neural network circuitry configured to train the second plurality of neurons to generate, based on a resulting speed value for the motor that occurs when the motor circuitry has controlled the set of switching elements to drive the motor based on the first cycle value, a second cycle value to minimize a difference between the second cycle value and the first cycle value.

Example 2. The apparatus of example 1, wherein, in response to determining that the difference between the second cycle value and the first cycle value is less than an error threshold, the neural network circuitry is configured to copy the second plurality of neurons into the first plurality of neurons such that the first plurality of neurons generates the first cycle value to correspond to the second cycle value generated by the second plurality of neurons when the resulting speed value corresponds to the target speed.

Example 3. The apparatus of any combination of examples 1-2, wherein, to generate the first cycle value, the first plurality of neurons is configured to generate the first cycle value further based on one or more of a first speed value for the motor at a first time that occurs before the motor circuitry has controlled, based on the first cycle value, the set of switching elements, a first current value for the motor at the first time, or a first previous cycle value used by the motor circuitry to control the set of switching elements at a second time that occurred before the first time; and wherein, to generate the second cycle value, the second plurality of neurons is configured to generate the second cycle value further based on one or more of the first speed value for the motor at the first time, the first current value for the motor at the first time, or the first previous cycle value used by the motor circuitry to control the set of switching elements at the second time.

Example 4. The apparatus of example 3, wherein, to generate the first cycle value, the first plurality of neurons is configured to generate the first cycle value further based on one or more of a second speed value for the motor at the second time, a second current value for the motor at the second time, or a second previous cycle value used by the motor circuitry to control the set of switching elements at a third time that occurred before the second time; and wherein, to generate the second cycle value, the second plurality of neurons is configured to generate the second cycle value further based on one or more of the second speed value for the motor at the second time, the second current value for the motor at the second time, or the second previous cycle value used by the motor circuitry to control the set of switching elements at the third time.

Example 5. The apparatus of any combination of examples 1-4, wherein, to control, based on the first cycle value, the set of switching elements to drive the motor, the motor circuitry is configured to: generate, based on the first cycle value, a digital modulated signal; and drive, based on the digital modulated signal, a set of switching elements to operate in at least a first switching state and a second switching state, wherein, during the first switching state, the set of switching elements electrically couples a first terminal of the motor and a first supply terminal and electrically couples a second terminal of the motor and a second supply terminal and wherein, during the second switching state, the set of switching elements electrically couples the second terminal of the motor and the first supply terminal and electrically couples the first terminal of the motor and the second supply terminal.

Example 6. The apparatus of any combination of examples 1-5, wherein the motor circuitry is configured to: measure a back-electromagnetic force voltage at the motor when the motor circuitry has controlled the set of switching elements to drive the motor based on the first cycle value; and determine the resulting speed value for the motor based on the back-electromagnetic force voltage.

Example 7. The apparatus of any combination of examples 1-6, wherein the motor circuitry is configured to: receive a reference speed; and determine the target speed based on the reference speed, the speed value associated with the motor at the particular time, and one or more previous speed values associated with the motor at one or more previous times that occur before the particular time.

Example 8. The apparatus of any combination of examples 1-7, wherein the first plurality of neurons have been trained to generate the first cycle value to minimize a difference between the first cycle value and a training cycle value for each training vector of a plurality of training vectors and wherein the apparatus has generated the plurality of training vectors.

Example 9. The apparatus of example 8, wherein a variable mechanical load has been applied to the motor when the neural network trains the first plurality of neurons.

Example 10. The apparatus of any combination of examples 1-9, wherein the motor comprises a DC brushless or a DC-excited motor.

Example 11. A method for driving a motor, the method comprising: generating, by a first plurality of neurons of neural network circuitry, a first cycle value based on a target speed; controlling, by motor circuitry and based on the first cycle value, a set of switching elements to drive the motor; and training, by the neural network circuitry, a second plurality of the neurons of neural network circuitry to generate, based on a resulting speed value for the motor that occurs when the motor circuitry has controlled the set of switching elements to drive the motor based on the first cycle value, a second cycle value to minimize a difference between the second cycle value and the first cycle value.

Example 12. The method of example 11, comprising: in response to determining that the difference between the second cycle value and the first cycle value is less than an error threshold, copying, by the neural network circuitry, the second plurality of neurons into the first plurality of neurons such that the first plurality of neurons generates the first cycle value to correspond to the second cycle value generated by the second plurality of neurons when the resulting speed value corresponds to the target speed; and when operating in the second state, training, by the neural network circuitry, the first plurality of neurons to generate, based on a second resulting speed value for the motor that occurs when the motor circuitry has controlled the set of switching elements to drive the motor based on the second cycle value, the first cycle value to minimize the difference between the second cycle value and the first cycle value.

Example 13. The method of any combination of examples 11-12, comprising: wherein generating the first cycle value comprises generating the first cycle value further based on one or more of a first speed value for the motor at a first time that occurs before the motor circuitry has controlled, based on the first cycle value, the set of switching elements, a first current value for the motor at the first time, or a first previous cycle value used by the motor circuitry to control the set of switching elements at a second time that occurred before the first time; and wherein generating the second cycle value comprises generating the second cycle value further based on one or more of the first speed value for the motor at the first time, the first current value for the motor at the first time, or the first previous cycle value used by the motor circuitry to control the set of switching elements at a second time.

Example 14. The method of example 13, wherein generating the first cycle value comprises generating the first cycle value further based on one or more of a second speed value for the motor at the second time, a second current value for the motor at the second time, or a second previous cycle value used by the motor circuitry to control the set of switching elements at a third time that occurred before the second time; and wherein generating the second cycle value comprises generating the second cycle value further based on one or more of the second speed value for the motor at the second time, the second current value for the motor at the second time, or the second previous cycle value used by the motor circuitry to control the set of switching elements at the third time.

Example 15. The method of any combination of examples 11-14, wherein controlling the set of switching elements to drive the motor based on the first cycle value comprises: generating, based on the first cycle value, a digital modulated signal; and driving, based on the digital modulated signal, a set of switching elements to operate in at least a first switching state and a second switching state, wherein, during the first switching state, the set of switching elements electrically couples a first terminal of the motor and a first supply terminal of a supply and electrically couples a second terminal of the motor and a second supply terminal of the supply and wherein, during the second switching state, the set of switching elements electrically couples the second terminal of the motor and the first supply terminal and electrically couples the first terminal of the motor and the second supply terminal.

Example 16. The method of any combination of examples 11-15, comprising: measuring, by the motor circuitry, a back-electromagnetic force voltage at the motor when the motor circuitry has controlled the set of switching elements to drive the motor based on the first cycle value; and determining, by the motor circuitry, the resulting speed value for the motor based on the back-electromagnetic force voltage.

Example 17. The method of any combination of examples 11-16, comprising: receiving, by the motor circuitry, a reference speed; and determining, by the motor circuitry, the target speed based on the reference speed, the speed value associated with the motor at the particular time, and one or more previous speed values associated with the motor at one or more previous times that occur before the particular time.

Example 18. The method of any combination of examples 11-17, wherein the first plurality of neurons have been trained to generate the first cycle value to minimize a difference between the first cycle value and a training cycle value for each training vector of a plurality of training vectors and wherein an apparatus for driving the motor has generated the plurality of training vectors.

Example 19. An apparatus for driving a motor, the apparatus comprising: motor circuitry configured to control a set of switching elements to drive the motor based on a first cycle value; a first plurality of neurons of neural network circuitry configured to: generate a plurality of training vectors; train, when a predetermined variable mechanical load is applied to the motor, the first plurality of neurons to generate the first cycle value to minimize a difference between the first cycle value and the training cycle value for each training vector of the plurality of training vectors; and generate the first cycle value based on a target speed; and a second plurality of neurons of the neural network circuitry configured to train, when the predetermined variable mechanical load is not applied to the motor, the second plurality of neurons to generate, based on a resulting speed value for the motor that occurs when the motor circuitry has controlled the set of switching elements to drive the motor based on the first cycle value, a second cycle value to minimize a difference between the second cycle value and the first cycle value.

Example 20. The apparatus of example 19, wherein the second plurality of neurons is configured to refrain from training when the predetermined variable mechanical load is applied to the motor.

Various aspects have been described in this disclosure. These and other aspects are within the scope of the following claims.

The invention claimed is:

1. An apparatus for driving a motor, the apparatus comprising:
a first plurality of neurons of neural network circuitry configured to generate a first cycle value based on a target speed;
motor circuitry configured to control, based on the first cycle value, a set of switching elements to drive the motor; and
a second plurality of neurons of the neural network circuitry configured to train the second plurality of neurons to generate, based on a resulting speed value for the motor that occurs when the motor circuitry has controlled the set of switching elements to drive the motor based on the first cycle value, a second cycle value to minimize a difference between the second cycle value and the first cycle value.

2. The apparatus of claim 1, wherein, in response to determining that the difference between the second cycle value and the first cycle value is less than an error threshold, the neural network circuitry is configured to copy the second plurality of neurons into the first plurality of neurons such that the first plurality of neurons generates the first cycle value to correspond to the second cycle value generated by the second plurality of neurons when the resulting speed value corresponds to the target speed.

3. The apparatus of claim 1,
wherein, to generate the first cycle value, the first plurality of neurons is configured to generate the first cycle value further based on one or more of a first speed value for the motor at a first time that occurs before the motor circuitry has controlled, based on the first cycle value, the set of switching elements, a first current value for the motor at the first time, or a first previous cycle value used by the motor circuitry to control the set of switching elements at a second time that occurred before the first time; and
wherein, to generate the second cycle value, the second plurality of neurons is configured to generate the second cycle value further based on one or more of the first speed value for the motor at the first time, the first current value for the motor at the first time, or the first previous cycle value used by the motor circuitry to control the set of switching elements at the second time.

4. The apparatus of claim 3,
wherein, to generate the first cycle value, the first plurality of neurons is configured to generate the first cycle value further based on one or more of a second speed value for the motor at the second time, a second current value for the motor at the second time, or a second previous cycle value used by the motor circuitry to control the set of switching elements at a third time that occurred before the second time; and
wherein, to generate the second cycle value, the second plurality of neurons is configured to generate the second cycle value further based on one or more of the second speed value for the motor at the second time, the second current value for the motor at the second time, or the second previous cycle value used by the motor circuitry to control the set of switching elements at the third time.

5. The apparatus of claim 1, wherein, to control, based on the first cycle value, the set of switching elements to drive the motor, the motor circuitry is configured to:
generate, based on the first cycle value, a digital modulated signal; and
drive, based on the digital modulated signal, a set of switching elements to operate in at least a first switching state and a second switching state, wherein, during the first switching state, the set of switching elements electrically couples a first terminal of the motor and a first supply terminal and electrically couples a second terminal of the motor and a second supply terminal and wherein, during the second switching state, the set of switching elements electrically couples the second terminal of the motor and the first supply terminal and electrically couples the first terminal of the motor and the second supply terminal.

6. The apparatus of claim 1, wherein the motor circuitry is configured to:
measure a back-electromagnetic force voltage at the motor when the motor circuitry has controlled the set of switching elements to drive the motor based on the first cycle value; and
determine the resulting speed value for the motor based on the back-electromagnetic force voltage.

7. The apparatus of claim 1, wherein the motor circuitry is configured to:
receive a reference speed; and
determine the target speed based on the reference speed, the speed value associated with the motor at the particular time, and one or more previous speed values associated with the motor at one or more previous times that occur before the particular time.

8. The apparatus of claim 1, wherein the first plurality of neurons have been trained to generate the first cycle value to minimize a difference between the first cycle value and a training cycle value for each training vector of a plurality of training vectors and wherein the apparatus has generated the plurality of training vectors.

9. The apparatus of claim 8, wherein a variable mechanical load has been applied to the motor when the neural network trains the first plurality of neurons.

10. The apparatus of claim 1, wherein the motor comprises a DC brushless or a DC-excited motor.

11. A method for driving a motor, the method comprising:
generating, by a first plurality of neurons of neural network circuitry, a first cycle value based on a target speed;
controlling, by motor circuitry and based on the first cycle value, a set of switching elements to drive the motor; and
training, by the neural network circuitry, a second plurality of the neurons of neural network circuitry to generate, based on a resulting speed value for the motor that occurs when the motor circuitry has controlled the set of switching elements to drive the motor based on the first cycle value, a second cycle value to minimize a difference between the second cycle value and the first cycle value.

12. The method of claim 11, comprising:
in response to determining that the difference between the second cycle value and the first cycle value is less than an error threshold, copying, by the neural network circuitry, the second plurality of neurons into the first plurality of neurons such that the first plurality of neurons generates the first cycle value to correspond to the second cycle value generated by the second plurality of neurons when the resulting speed value corresponds to the target speed; and
when operating in the second state, training, by the neural network circuitry, the first plurality of neurons to generate, based on a second resulting speed value for the motor that occurs when the motor circuitry has controlled the set of switching elements to drive the motor based on the second cycle value, the first cycle value to minimize the difference between the second cycle value and the first cycle value.

13. The method of claim 11, comprising:
wherein generating the first cycle value comprises generating the first cycle value further based on one or more of a first speed value for the motor at a first time that occurs before the motor circuitry has controlled, based on the first cycle value, the set of switching elements, a first current value for the motor at the first time, or a first previous cycle value used by the motor circuitry to control the set of switching elements at a second time that occurred before the first time; and
wherein generating the second cycle value comprises generating the second cycle value further based on one or more of the first speed value for the motor at the first time, the first current value for the motor at the first time, or the first previous cycle value used by the motor circuitry to control the set of switching elements at a second time.

14. The method of claim 13,
wherein generating the first cycle value comprises generating the first cycle value further based on one or more of a second speed value for the motor at the second time, a second current value for the motor at the second time, or a second previous cycle value used by the motor circuitry to control the set of switching elements at a third time that occurred before the second time, and
wherein generating the second cycle value comprises generating the second cycle value further based on one or more of the second speed value for the motor at the second time, the second current value for the motor at the second time, or the second previous cycle value used by the motor circuitry to control the set of switching elements at the third time.

15. The method of claim 11, wherein controlling the set of switching elements to drive the motor based on the first cycle value comprises:
generating, based on the first cycle value, a digital modulated signal; and
driving, based on the digital modulated signal, a set of switching elements to operate in at least a first switching state and a second switching state, wherein, during the first switching state, the set of switching elements electrically couples a first terminal of the motor and a first supply terminal of a supply and electrically couples a second terminal of the motor and a second supply terminal of the supply and wherein, during the second switching state, the set of switching elements electrically couples the second terminal of the motor and the first supply terminal and electrically couples the first terminal of the motor and the second supply terminal.

16. The method of claim 11, comprising:

measuring, by the motor circuitry, a back-electromagnetic force voltage at the motor when the motor circuitry has controlled the set of switching elements to drive the motor based on the first cycle value; and determining, by the motor circuitry, the resulting speed value for the motor based on the back-electromagnetic force voltage.

17. The method of claim 11, comprising:

receiving, by the motor circuitry, a reference speed; and determining, by the motor circuitry, the target speed based on the reference speed, the speed value associated with the motor at the particular time, and one or more previous speed values associated with the motor at one or more previous times that occur before the particular time.

18. The method of claim 11, wherein the first plurality of neurons have been trained to generate the first cycle value to minimize a difference between the first cycle value and a training cycle value for each training vector of a plurality of training vectors and wherein an apparatus for driving the motor has generated the plurality of training vectors.

19. An apparatus for driving a motor, the apparatus comprising:

motor circuitry configured to control a set of switching elements to drive the motor based on a first cycle value;

a first plurality of neurons of neural network circuitry configured to:

generate a plurality of training vectors;

train, when a predetermined variable mechanical load is applied to the motor, the first plurality of neurons to generate the first cycle value to minimize a difference between the first cycle value and the training cycle value for each training vector of the plurality of training vectors; and generate the first cycle value based on a target speed; and a second plurality of neurons of the neural network circuitry configured to train, when the predetermined variable mechanical load is not applied to the motor, the second plurality of neurons to generate, based on a resulting speed value for the motor that occurs when the motor circuitry has controlled the set of switching elements to drive the motor based on the first cycle value, a second cycle value to minimize a difference between the second cycle value and the first cycle value.

20. The apparatus of claim 19, wherein the second plurality of neurons is configured to refrain from training when the predetermined variable mechanical load is applied to the motor.

* * * * *